(12) United States Patent
Aiba et al.

(10) Patent No.: US 10,530,444 B2
(45) Date of Patent: Jan. 7, 2020

(54) TERMINAL APPARATUS, BASE STATION APPARATUS, COMMUNICATION METHOD, AND INTEGRATED CIRCUIT

(71) Applicant: SHARP KABUSHIKI KAISHA, Sakai, Osaka (JP)

(72) Inventors: Tatsushi Aiba, Sakai (JP); Shoichi Suzuki, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/088,788

(22) PCT Filed: Mar. 9, 2017

(86) PCT No.: PCT/JP2017/009391
§ 371 (c)(1),
(2) Date: Sep. 26, 2018

(87) PCT Pub. No.: WO2017/169611
PCT Pub. Date: Oct. 5, 2017

(65) Prior Publication Data
US 2019/0052329 A1 Feb. 14, 2019

(30) Foreign Application Priority Data
Mar. 30, 2016 (JP) ................. 2016-067453

(51) Int. Cl.
*H04M 1/00* (2006.01)
*H04B 7/06* (2006.01)
(Continued)

(52) U.S. Cl.
CPC ....... *H04B 7/0615* (2013.01); *H04B 7/15535* (2013.01); *H04L 5/006* (2013.01);
(Continued)

(58) Field of Classification Search
CPC ..... H04W 72/04; H04W 28/16; H04W 76/02; H04W 16/10; H04W 16/14; H04W 16/24;
(Continued)

(56) References Cited

U.S. PATENT DOCUMENTS

2014/0226607 A1* 8/2014 Holma ................ H04L 1/1812
370/329
2014/0362792 A1* 12/2014 Cheng ................ H04L 1/0029
370/329

(Continued)

OTHER PUBLICATIONS

Ericsson, "3GPP TR 36.881 V05.2 (Feb. 2016) Evolved Universal Terrestrial Radio Access (EUTRA); Study on latency reduction techniques for LTE (Release 13)", R2-161963.
(Continued)

*Primary Examiner* — Temica M Beamer
(74) *Attorney, Agent, or Firm* — ScienBiziP, P.C.

(57) ABSTRACT

Uplink data is transmitted efficiently. Provided is a terminal apparatus including a receiver configured to receive a first UL grant, a second UL grant and a random access response grant, and a transmitter configured to perform transmission on a PUSCH. In a case that the transmission on the PUSCH corresponds to the second UL grant to which a CRC parity bit scrambled by a C-RNTI is attached, first transmission is performed on the PUSCH at a transmission time interval of a length indicated using the second UL grant. In a case that the transmission on the PUSCH corresponds to a random access response grant, second transmission on the PUSCH is performed at a transmission time interval of a length of 1 ms.

4 Claims, 8 Drawing Sheets

(51) Int. Cl.
  *H04W 74/08* (2009.01)
  *H04L 5/00* (2006.01)
  *H04B 7/155* (2006.01)
  *H04W 72/14* (2009.01)
  *H04W 72/12* (2009.01)

(52) U.S. Cl.
  CPC .......... *H04L 5/0035* (2013.01); *H04L 5/0044* (2013.01); *H04L 5/0051* (2013.01); *H04L 5/0053* (2013.01); *H04W 74/0833* (2013.01); *H04W 72/1289* (2013.01); *H04W 72/14* (2013.01)

(58) Field of Classification Search
  CPC ..... H04W 16/28; H04W 88/02; H04W 88/08; H04W 88/085; H04M 1/72519; H04M 1/72522; H04M 1/0214; H04M 2250/12
  USPC ............ 455/562.1, 561, 450, 550.1; 370/321
  See application file for complete search history.

(56) References Cited

U.S. PATENT DOCUMENTS

2015/0341915 A1* 11/2015 Lyu ....................... H04W 16/10
                                                                      370/277
2016/0128089 A1* 5/2016 Seo .......................... H04L 5/00
                                                                      370/329
2016/0143030 A1* 5/2016 Lee .......................... H04L 5/00
                                                                      370/329
2017/0188340 A1* 6/2017 Andgart ............... H04L 5/0044
2017/0208581 A1* 7/2017 Yang .................... H04W 72/14
2018/0042013 A1* 2/2018 Byun ...................... H04J 11/00
2018/0332566 A1* 11/2018 You ........................ H04L 5/00

OTHER PUBLICATIONS

Ericsson: "DCI for short TTI uplink transmissions", R1-160938, 3GPP TSG RAN WG1 Meeting #84, Malta, Feb. 15-19, 2016.

Interdigital Communications: "Support for Short TTIs and Processing Times in LTE", R1-157136, 3GPP TSG-RAN WG1 #83, Anaheim, USA, Nov. 16-20, 2015.

Ericsson: "DCI bit fields for short TTI uplink transmissions", R1-160941, 3GPP TSG RAN WG1 Meeting #84, Malta, Feb. 15-19, 2016.

Huawei et al: "Control signaling enhancements for short TTI", R1-156461, 3GPP TSG RAN WG1 Meeting #83, Anaheim, USA, Nov. 15-22, 2015.

\* cited by examiner

| TTI index | TTI length | DMRS position | Cyclic shift of DMRS | Grant to TX delay offset | (s)PUSCH transmission (SC-FDMA symbols) | | | | | | |
|---|---|---|---|---|---|---|---|---|---|---|---|
| | | | | | #0 | #1 | #2 | #3 | #4 | #5 | #6 |
| 0 | 2 | 0 | 0 | 0 | R | D | | | | | |
| 1 | 2 | 1 | 4 | 1 | D | R | | | | | |
| 2 | 2 | 2 | 8 | 2 | D | | R | | | | |
| 3 | 2 | 3 | 12 | 3 | D | | | R | | | |
| 4 | 2 | -1 | 0 | 0 | R | | D | | | | |
| 5 | 2 | -2 | 4 | 1 | R | | | D | | | |
| 6 | 3 | 0 | 8 | 2 | R | D | D | | | | |
| 7 | 3 | 1 | 12 | 3 | D | R | D | | | | |
| 8 | 3 | 2 | 0 | 0 | D | D | R | | | | |
| 9 | 3 | 3 | 4 | 1 | D | D | | R | | | |
| 10 | 3 | -1 | 8 | 2 | R | | D | D | | | |
| 11 | 4 | 0 | 12 | 3 | R | D | D | D | | | |
| 12 | 4 | 1 | 0 | 1 | D | R | D | D | | | |
| 13 | 4 | 2 | 4 | 0 | D | D | R | D | | | |
| 14 | 4 | 3 | 8 | 2 | D | D | D | R | | | |
| 15 | 7 | 3 | 0 | 0 | D | D | D | R | D | D | D |

FIG. 4

| TTI length (SC-FDMA symbols) | Fixed delay (minimum delay) between first symbol of UL grant and first symbol of (s)PUSCH |
|---|---|
| 2 | 2 × 4 = 8 symbols |
| 3 | 3 × 4 = 12 symbols |
| 4 | 4 × 4 = 16 symbols |
| 7 | 7 × 4 = 28 symbols (2 ms) |
| 14 (1 ms) | 14 × 4 = 56 symbols (4 ms) |

FIG. 5

TERMINAL APPARATUS, BASE STATION APPARATUS, COMMUNICATION METHOD, AND INTEGRATED CIRCUIT

TECHNICAL FIELD

The present invention relates to a terminal apparatus, a base station apparatus, a communication method, and an integrated circuit.

This application claims priority based on JP 2016-067453 filed on Mar. 30, 2016, the contents of which are incorporated herein by reference.

BACKGROUND ART

In the 3rd Generation Partnership Project (3GPP), a radio access method and a radio network for cellular mobile communications (hereinafter, referred to as "Long Term Evolution (LTE)", or "Evolved Universal Terrestrial Radio Access (EUTRA)") have been studied (NPL 1). In LTE, a base station apparatus is also referred to as an evolved NodeB (eNodeB), and a terminal apparatus is also referred to as User Equipment (UE). LTE is a cellular communication system in which multiple areas each covered by the base station apparatus are deployed to form a cellular structure. In such a cellular communication system, a single base station apparatus may manage multiple cells.

In 3GPP, latency reduction enhancements have been studied. For example, as a solution to the latency reduction, Semi-Persistent Scheduling (SPS), UL Grant reception, Configured SPS activation and deactivation, and the like are being studied (NPL 1).

CITATION LIST

Non Patent Literature

NPL 1: "3GPP TR 36.881 V0.5.2 (2016 February) Evolved Universal Terrestrial Radio Access (E-UTRA); Study on latency reduction techniques for LTE (Release 13)", R2-161963, Ericsson.

SUMMARY OF INVENTION

Technical Problem

However, for the radio communication system as described above, a concrete procedure when transmitting uplink data has not been sufficiently studied.

The present invention has been made in light of the foregoing, and an object of the present invention is to provide a terminal apparatus, a base station apparatus, a communication method, and an integrated circuit, which enable efficient transmission of uplink data.

Solution to Problem (1) To accomplish the object described above, aspects of the present invention are contrived to provide the following measures. That is, a terminal apparatus according to an aspect of the present invention includes a receiver configured to receive a first UL grant, a second UL grant and a random access response grant, and a transmitter configured to perform transmission with a PUSCH. In a case that the transmission with the PUSCH corresponds to the second UL grant to which a CRC parity bit scrambled with a C-RNTI is attached, first transmission is performed with the PUSCH at a transmission time interval of a length indicated using the second UL grant. In a case that the transmission with the PUSCH corresponds to a random access response grant, second transmission with the PUSCH is performed at a transmission time interval of a length of 1 ms. A bandwidth for the first transmission with the PUSCH is scheduled using the first UL grant. A bandwidth for the second transmission with the PUSCH is scheduled using the random access response grant.

(2) A base station apparatus according to an aspect of the present invention includes a transmitter configured to transmit a first UL grant, a second UL grant and a random access response grant, and a receiver configured to perform reception with a PUSCH. In a case that the reception with the PUSCH corresponds to the second UL grant to which a CRC parity bit scrambled with a C-RNTI is attached, first reception is performed with the PUSCH at a transmission time interval of a length indicated using the second UL grant. In a case that the transmission with the PUSCH corresponds to a random access response grant, second reception with the PUSCH is performed at a transmission time interval of a length of 1 ms. A bandwidth for the first reception with the PUSCH is scheduled using the first UL grant. A bandwidth for the second reception with the PUSCH is scheduled using the random access response grant.

(3) A communication method for a terminal apparatus according to an aspect of the present invention includes the steps of: receiving a first UL grant, a second UL grant, and a random access response grant; performing transmission with a PUSCH; in a case that the transmission with the PUSCH corresponds to the second UL grant to which a CRC parity bit scrambled with a C-RNTI is attached, performing first transmission with the PUSCH at a transmission time interval of a length indicated using the second UL grant; in a case that the transmission with the PUSCH corresponds to a random access response grant, performing second transmission with the PUSCH at a transmission time interval of a length of 1 ms, wherein a bandwidth for the first transmission with the PUSCH is scheduled using the first UL grant, and a bandwidth for the second transmission with the PUSCH is scheduled using the random access response grant.

(4) A communication method for a base station apparatus according to an aspect of the present invention includes the steps of: transmitting a first UL grant, a second UL grant, and a random access response grant; performing reception with a PUSCH; in a case that the reception with the PUSCH corresponds to the second UL grant to which a CRC parity bit scrambled with a C-RNTI is attached, performing first reception with the PUSCH at a transmission time interval of a length indicated using the second UL grant; in a case that the transmission with the PUSCH corresponds to a random access response grant, performing second reception with the PUSCH at a transmission time interval of a length of 1 ms, wherein a bandwidth for the first reception with the PUSCH is scheduled using the first UL grant, and a bandwidth for the second reception with the PUSCH is scheduled using the random access response grant.

(5) An integrated circuit mounted in a terminal apparatus according to an aspect of the present invention causes the terminal apparatus to exhibit a function of receiving a first UL grant, a second UL grant and a random access response grant, and a function of performing transmission with a PUSCH. In a case that the transmission with the PUSCH corresponds to the second UL grant to which a CRC parity bit scrambled with a C-RNTI is attached, first transmission with the PUSCH is performed at a transmission time interval of a length indicated using the second UL grant. In a case that the transmission with the PUSCH corresponds to a random access response grant, second transmission with the PUSCH is performed at a transmission time interval of a length of 1 ms. A bandwidth for the first transmission with the PUSCH is scheduled using the first UL grant. A bandwidth for the second transmission with the PUSCH is scheduled using the random access response grant.

(6) An integrated circuit mounted in a base station apparatus according to an aspect of the present invention causes the base station apparatus to exhibit a function of transmitting a first UL grant, a second UL grant and a random access response grant, and a function of performing reception with a PUSCH. In a case that the reception with the PUSCH corresponds to the second UL grant to which a CRC parity bit scrambled with a C-RNTI is attached, first reception with the PUSCH is performed at a transmission time interval of a length indicated using the second UL grant. In a case that the transmission with the PUSCH corresponds to a random access response grant, second reception with the PUSCH is performed at a transmission time interval of a length of 1 ms. A bandwidth for the first reception with the PUSCH is scheduled using the first UL grant. A bandwidth for the second reception with the PUSCH is scheduled using the random access response grant.

Advantageous Effects of Invention

According to the present invention, uplink data can be transmitted efficiently.

BRIEF DESCRIPTION OF DRAWINGS

FIG. 4 is another diagram illustrating an uplink data transmission method according to the present embodiment.

FIG. 5 is another diagram illustrating an uplink data transmission method. according to the present embodiment.

DESCRIPTION OF EMBODIMENTS

Embodiments of the present invention will be described below.

Figure 1:
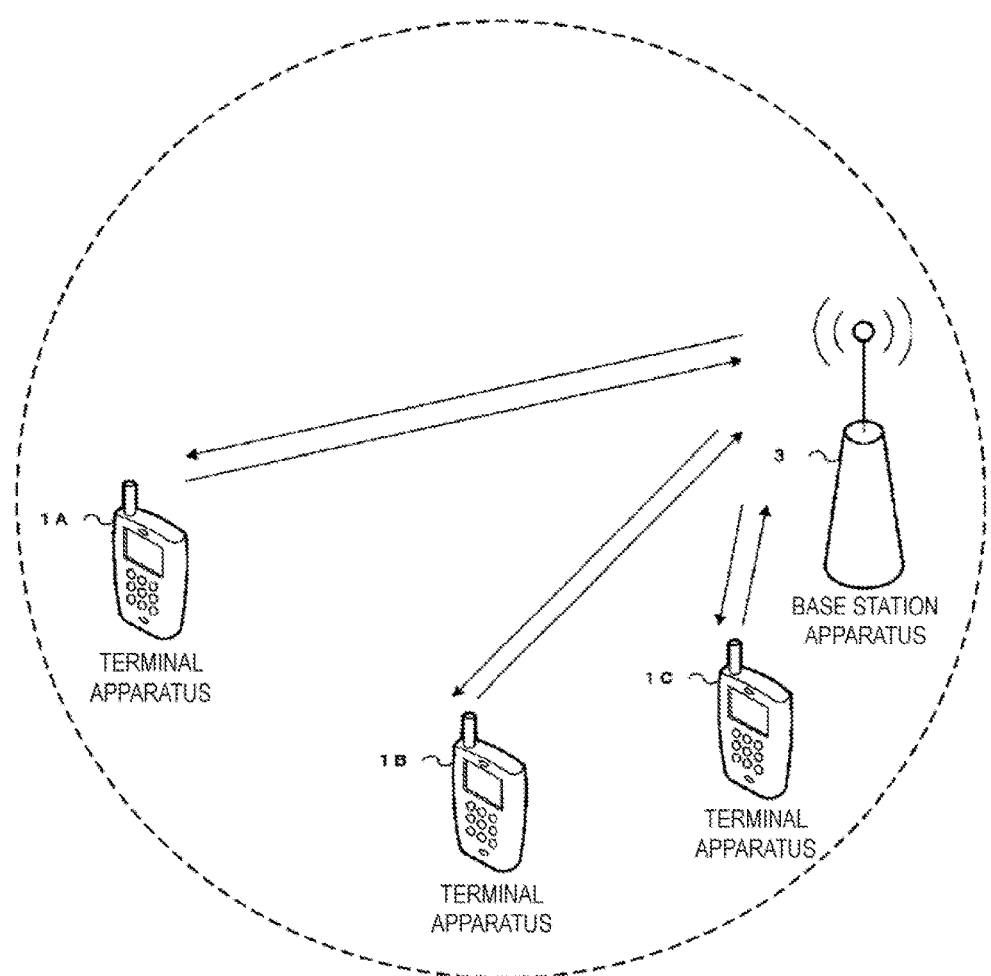
FIG. 1 is a diagram illustrating a concept of a radio communication system according to the present embodiment.

FIG. 1 is a conceptual diagram of a radio communication system according to the present embodiment. In FIG. 1, the radio communication system includes terminal apparatuses 1A to 1C and a base station apparatus 3. Hereinafter, the terminal apparatuses 1A to 1C are each also referred to as a terminal apparatus 1.

Physical channels and physical signals according to the present embodiment will be described.

In FIG. 1, the following uplink physical channels are used for uplink radio communication from the terminal apparatus 1 to the base station apparatus 3. Here, the uplink physical channels are used to transmit information output from the higher layers.

Physical Uplink Control CHannel (PUCCH)
short Physical Uplink Control CHannel (sPUCCH)
Physical Uplink Shared CHannel (PUSCH)
short Physical Uplink Shared CHannel (sPUSCH)
Physical Random Access CHannel (PRACH)
short Physical Random Access CHannel (sPRACH)

The PUCCH and/or the sPUCCH is used for transmission of Uplink Control Information (UCI). Hereinafter, the PUCCH may include the sPUCCH. Here, the Uplink Control Information may include Channel State Information (CSI) used to indicate a downlink channel state. The Uplink Control Information may include a Scheduling Request (SR) used to request an UL-SCH resource. The Uplink Control Information may include Hybrid Automatic Repeat reQuest ACKnowledgment (HARQ-ACK).

Here, the HARQ-ACK may indicate HARQ-ACK for downlink data (Transport block, Medium Access Control Protocol Data Unit (MAC PDU), Downlink-Shared CHannel (DL-SCH), or Physical Downlink Shared CHannel (PUSCH)). In other words, the HARQ-ACK may indicate ACKnowledgment, that is, positive-ACKnowledgement (ACK), or Negative-ACKnowledgment (NACK) for the downlink data. Here, the HARQ-ACK may also be referred to as ACK/NACK, HARQ feedback, HARQ acknowledgment, HARQ information, or HARQ control information.

The PUSCH and/or the sPUSCH is used for transmission of uplink data (UpLink-Shared CHannel (UL-SCH)). Hereinafter, the PUSCH may include the sPUSCH, Furthermore, the PUSCH may be used to transmit HARQ-ACK and/or CSI along with the uplink data. Furthermore, the PUSCH may be used to transmit CSI only or HARQ-ACK and CSI only. In other words, the PUSCH may be used to transmit the Uplink Control Information only.

Here, the base station apparatus 3 and the terminal apparatus 1 may exchange (transmit and/or receive) signals with each other in their respective higher layers. For example, the base station apparatus 3 and the terminal apparatus 1 may transmit and/or receive RRC signaling (also called "RRC message" or "RRC information") in a Radio Resource Control (RRC) layer. The base station apparatus 3 and the terminal apparatus 1 may transmit and/or receive a Medium Access Control (MAC) control element in a MAC layer, respectively. Here, the RRC signaling and/or the MAC control element is also referred to as higher layer signaling.

In the present embodiment, "higher layer parameter", "higher layer message", "higher layer signaling", "higher layer information", and "higher layer information element" may be identical to each other.

Further, the PUSCH may be used to transmit the RRC signaling and the MAC control element. Here, the RRC signaling transmitted from the base station apparatus 3 may be signaling common to multiple terminal apparatuses 1 in a cell. The RRC signaling transmitted from the base station apparatus 3 may be signaling dedicated to a certain terminal apparatus 1 (also referred to as dedicated signaling). In other words, user-equipment-specific information (information unique to user equipment) may be transmitted through signaling dedicated to the certain terminal apparatus 1.

The PRACH and/or the sPRACH is used to transmit a random access preamble. Hereinafter, the PRACH may include the sPRACH. For example, the PRACH (or a random access procedure) is used mainly for the terminal apparatus 1 to be synchronized with the base station apparatus 3 in a time domain. In addition, the PRACH (or the random access procedure) may be used for an initial connection establishment procedure, a handover procedure, a connection re-establishment procedure, uplink transmission synchronization (timing adjustment), and transmission of a scheduling request (a PUSCH resource request or an UL-SCH resource request).

In FIG. 1, the following uplink physical signal is used in the uplink radio communication. Here, the uplink physical signal is not used to transmit information output from the higher layers but is used by the physical layer.

Uplink Reference Signal (UL RS)

In the present embodiment, the following two types of uplink reference signals are used.

Demodulation Reference Signal (DMRS)
Sounding Reference Signal (SRS)

The DMRS is associated with transmission of the PUSCH, the sPUSCH, and/or PUCCH. The DMRS may be time-multiplexed with the PUSCH, the sPUSCH, or the PUCCH. For example, the base station apparatus 3 may use the DMRS in order to perform channel compensation of the PUSCH, the sPUSCH, or the PUCCH. Transmission of both of the PUSCH and the DMRS is hereinafter also referred to simply as transmission of the PUSCH. Transmission of both of the sPUSCH and the DMRS is also referred to simply as transmission of the sPUSCH. Transmission of both of the PUCCH and the DMRS is also referred to simply as transmission of the PUCCH.

The SRS is not associated with the transmission of the PUSCH or the PUCCH. For example, the base station apparatus 3 may use the SRS to measure an uplink channel state.

In FIG. 1, the following downlink physical channels are used for downlink radio communication from the base station apparatus 3 to the terminal apparatus 1. Here, the downlink physical channels are used to transmit the information output from the higher layers.

Physical Broadcast CHannel (PBCH)
Physical Control Format Indicator CHannel (PCFICH)
Physical Hybrid automatic repeat request Indicator CHannel (PHICH)
Physical Downlink Control CHannel (PDCCH)
Enhanced Physical Downlink Control CHannel (EPDCCH)
short Physical Downlink Control CHannel (sPDCCH)
Physical Downlink Shared CHannel (PDSCH)
short Physical Downlink Shared CHannel (sPDSCH)
Physical Multicast CHannel (PMCH)

The PBCH is used for broadcasting a Master Information Block (MIB, Broadcast Channel (BCH)), which is shared by the terminal apparatuses 1.

The PCFICH is used for transmission of information indicating a region (OFDM symbols) to be used for transmission of the PDCCH.

The PHICH is used for transmission of a HARQ indicator (HARQ feedback or response information) indicating an ACKnowledgement (ACK) or a Negative ACKnowledgement (NACK) for the uplink data (UpLink Shared CHannel (UL-SCH)) received by the base station apparatus 3.

The PDCCH, the EPDCCH, and/or the sPDCCH is used for transmitting Downlink Control Information (DCI). In the present embodiment, the PDCCH may include the EPDCCH. In addition, the PDCCH may include the sPDCCH.

Here, multiple DCI formats may be defined for the Downlink Control Information transmitted with the PDCCH, the EPDCCH, and/or the sPDCCH. In other words, a field for the Downlink Control Information may be defined in a DCI format and may be mapped to information bits.

Here, the downlink DCI format is also referred to as downlink DCI, downlink grant, and/or downlink assignment. In addition, the uplink DCI format is also referred to as Uplink DCI, Uplink grant, and/or Uplink assignment.

For example, as the downlink assignment, DCI formats (e.g., DCI format 1, DCI format 1A, and/or DCI format 1C) to be used for the scheduling of one PDSCH in one cell may be defined.

Further, as the Uplink grant, a DCI format (hereinafter, also described as a first UL grant or first UL DCI) may be defined in which at least information associated with frequency resource allocation for the PUSCH, the sPUSCH, and/or the sPDCCH (e.g., information associated with physical resource block allocation for the PUSCH, the sPUSCH, and/or the sPDCCH) is included. In other words, the first UL grant may be used at least for the scheduling of the PUSCH, the sPUSCH, and/or the sPDCCH.

For example, the first UL grant may include information associated with a bandwidth for the PUSCH to be scheduled, the sPUSCH to be scheduled, and/or the sPDCCH to be scheduled. In other words, the first UL grant may include information associated with the bandwidth to be scheduled for the transmission on the PUSCH, the transmission on the sPUSCH, and/or the transmission on the sPDCCH.

For example, the first UL grant may include information associated with a start position (and/or an end position, for example, a length from the start position) of the physical resource block for the PUSCH to be scheduled, the sPUSCH to be scheduled, and/or the sPDCCH to be scheduled. In addition, the first UL grant may include information to indicate the physical resource block for the PUSCH to be scheduled, the sPUSCH to be scheduled, and the sPDCCH to be scheduled.

Here, information transmitted the first UL grant may be transmitted using higher layer signaling (e.g., signaling in the MAC layer and/or signaling in an RRC layer). Hereinafter, although it will be described that information is transmitted using the first UL grant, the information transmitted using the first UL grant may be transmitted using the higher layer signaling.

The first UL grant may be defined as DCI common to multiple terminal apparatuses 1 (UL grant, Common UL grant, Non-UE specific UL grant). In other words, the first UL grant may be transmitted only within a common search space, which will be explained later. Moreover, the first UL grant may be transmitted only with the PDCCH and/or the EPDCCH.

CRC parity bits to be attached to the first UL grant may be scrambled with an RNTI, which will be explained later. The CRC parity bits to be attached to the first UL grant may be scrambled with a first UL-RNTI. A search space (e.g., common search space) with which the first UL grant is transmitted may be given at least by the first UL-RNTI.

The first UL grant may be used to define a configuration for a certain one subframe. That is, the first UL grant may be used to indicate a configuration used in common in a certain one subframe. In other words, the configuration indicated using the first UL grant may be valid for one subframe or each of multiple subframes. That is, the first UL grant may be a subframe specific UL grant.

Further, as the Uplink grant, a DCI format (hereinafter, also described as a second UL grant or second UL DCI) may be defined in which at least information associated with time resource allocation for the PUSCH and/or the sPUSCH is included. For example, the second UL grant may include information associated with allocation of a Transmission Time Interval (TTI) for the transmission on the PUSCH and/or the sPUSCH. In other words, the second UL grant may be used at least for the scheduling of the PUSCH and/or the sPUSCH.

For example, the second UL grant may include information associated with a length of the Transmission Time Interval for the PUSCH to be scheduled and/or the sPUSCH to be scheduled. Further, the second UL grant may include information associated with a position of the DMRS transmitted along with the PUSCH to be scheduled. In addition, the second UL grant may include information associated with the position of the DMRS transmitted along with the sPUSCH to be scheduled.

The second UL grant may include information associated with the DMRS (e.g., information associated with a cyclic shift of the DMRS) transmitted along with the PUSCH to be scheduled. Further, the second UL grant may include information associated with the DMRS (e.g., information associated with the cyclic shift of the DRMS) transmitted along with the sPUSCH to be scheduled.

The second UL grant may include information associated with a delay for the transmission on the PUSCH and/or the transmission on the sPUSCH (Grant to Tx delay offset) based on the reception (detection) of the second UL grant. In addition, the second UL grant may include information associated with an MCS for the PUSCH to be scheduled and/or the sPUSCH to be scheduled. The second UL grant may include information associated with a redundancy version for the PUSCH to be scheduled and/or the sPUSCH to be scheduled. Further, the second UL grant may include information associated with a transmit power control command for the transmission on the PUSCH to be scheduled and/or the sPUSCH to be scheduled.

The second UL grant may be defined as DCI dedicated to a certain one terminal apparatus 1 (UL grant, UE-specific UL grant). In other words, the second UL grant may be transmitted only within a UE specific space, which will be explained later. Moreover, the second UL grant may be transmitted with the PDCCH, the EPDCCH, and/or the sPDCCH. In addition, the second UL grant may be transmitted with the PDSCH.

CRC parity bits to be attached to the second UL grant may be scrambled with the RNTI, which will be explained later. The CRC parity bits to be attached to the second UL grant may be scrambled with a second UL-RNTI. A search space with which the second UL grant is transmitted (e.g., a UE-specific search space) may be given at least by the second UL-RNTI.

The second UL grant may be used to define a configuration for a certain one Transmission Time Interval. That is, the second UL grant may be used to indicate a configuration used in a certain one Transmission Time Interval. In other words, the configuration indicated using the second UL grant may be valid for one Transmission Time Interval. That is, the second UL grant may be a TTI specific UL grant.

As discussed above, the first UL grant may be used for the scheduling of the sPDCCH on which the second UL grant is transmitted. For example, the terminal apparatus 1 may receive (detect) the second UL grant by reception (detection) of the first UL grant. The terminal apparatus 1 may monitor (decode, detect) the PDCCH, EPDCCH, and/or sPDCCH on which the second UL grant is transmitted by monitoring (decoding, detecting) the PDCCH and/or EPDCCH on which the first UL grant is transmitted.

Here, the PDCCH and/or EPDCCH on which the first UL grant is transmitted may be detected by the terminal apparatus 1 monitoring, and the PDCCH, EPDCCH, and/or sPDCCH (the frequency resource of the PDCCH, EPDCCH, and/or sPDCCH) on which the second UL grant is transmitted may be directly indicated (for example, may be directly indicated by the information included in the first UL grant). In other words, the PDCCH, EPDCCH, and/or sPDCCH on which the second UL grant is transmitted may not be monitored by the terminal apparatus 1.

DCI formats (e.g., DCI format 0, DCI format 4; hereinafter also referred to as a third UL grant) to be used for the scheduling of one PUSCH in one cell may be defined as the Uplink grant.

For example, the third UL grant may include Downlink Control Information such as a Carrier Indicator Field (CIF), information of a Transmit Power Command (TPC command) for the scheduled PUSCH, information of a Cyclic shift DMRS, information of a Modulation and Coding Scheme (MCS) and/or redundancy version, information of Resource block assignment and/or hopping resource allocation, information of a CSI transmission request (CSI request), and/or an SRS transmission request (SRS request).

The third UL grant may be defined as DCI common to multiple terminal apparatuses 1 and/or defined as DCI dedicated to a certain one terminal apparatus 1. In other words, the third UL grant may be transmitted within a common search space and/or a UE-specific search space. Moreover, the third UL grant may be transmitted with the PDCCH and/or the EPDCCH. CRC parity bits to be attached to the third UL grant may be scrambled with the RNTI, which will be explained later.

The third UL grant may be used to define a configuration for a certain one subframe. That is, the third UL grant may be used to indicate a configuration used in common in a certain one subframe. In other words, the configuration indicated using the third UL grant may be valid for each one subframe. That is, the third UL grant may be a subframe specific UL grant.

As the Uplink grant, a random access response grant (hereinafter, also referred to as a fourth UL grant) to be used for the scheduling of the PUSCH in the random access procedure, which will be explained later, may be defined.

For example, the random access response grant may include information associated with frequency resource allocation for the PUSCH. For example, the random access response grant may include information associated with a bandwidth for the PUSCH to be scheduled. In other words, the random access response grant may include information associated with the bandwidth to be scheduled for the transmission on the PUSCH.

For example, the random access response grant may include information associated with a physical resource block start position (and/or an end position, for example, a length from the start position) for the PUSCH to be scheduled. In addition, the random access response grant may include information to indicate the physical resource block for the PUSCH to be scheduled.

The random access response grant may include information associated with a Transmit Power Command for the PUSCH to be scheduled. Further, the random access response grant may include information (UL delay) used to indicate whether to postpone the transmission on the PUSCH until the next available uplink subframe. The random access response grant may include information associated with the CSI transmission request.

The random access response grant may be transmitted on the PDSCH. For example, the random access response grant may be transmitted on the scheduled PDSCH using a DCI format (the PDCCH with an RA-RNTI) to be explained later to which the CRC parity bits scrambled with the RA-RNTI are attached.

The random access response grant may be used to define a configuration for a certain one subframe. That is, the random access response grant may be used to indicate a configuration used in common in a certain one subframe. In other words, the configuration indicated using the random access response grant may be valid for each one subframe. That is, the random access response grant may be a subframe specific UL grant.

Hereinafter, the Uplink grant may include the first UL grant, the second UL grant, the third UL grant, and/or the random access response grant. Further, the DCI format may include the first UL grant, the second UL grant, and/or the third UL grant.

Here, in a case that a PDSCH resource is scheduled using the downlink assignment, the terminal apparatus 1 may receive downlink data on the PDSCH based on the scheduling. In a case that a PUSCH resource is scheduled using the Uplink grant, the terminal apparatus 1 may transmit uplink data and/or Uplink Control Information on the PUSCH based on the scheduling. In a case that a sPUSCH resource is scheduled using the Uplink grant, the terminal apparatus 1 may transmit uplink data and/or Uplink Control Information on the sPUSCH based on the scheduling.

In addition, the terminal apparatus 1 may monitor a set of PDCCH candidates, EPDCCH candidates, and/or sPDCCH candidates. The PDCCH may include an EPDCCH and/or the sPDCCH hereinafter.

Here, the PDCCH candidates may indicate such PDCCH candidates that may be allocated and/or transmitted by the base station apparatus 3. Furthermore "monitor" may imply that the terminal apparatus 1 attempts to decode each PDCCH in the set of PDCCH candidates in accordance with each of all the monitored DCI formats.

The set of PDCCH candidates to be monitored by the terminal apparatus 1 is also referred to as a search space. The search space may include a Common Search Space (CSS). For example, the Common Search Space may be defined as a space common to multiple terminal apparatuses 1.

The search space may include a UP-specific Search Space (USS). For example, UE-specific Search Space may be given based on at least a C-RNTI assigned to the terminal apparatus 1. The terminal apparatus 1 may monitor the PDCCHs in the Common Search Space and/or the UE-specific Search Space to detect a PDCCH destined for the terminal apparatus 1 itself.

Further, an RNTI assigned to the terminal apparatus 1 by the base station apparatus 3 may be used for the transmission of the Downlink Control Information (transmission on the PDCCH). Specifically, Cyclic Redundancy Check (CRC) parity bits are attached to the DCI format (or Downlink Control Information), and after the attachment, the CRC parity bits may be scrambled by the RNTI. Here, the CRC parity bits attached to the DCI format may be obtained from a payload of the format.

In the present embodiment, "CRC parity bits", "CRC bits", and "CRC" may be identical to each other. Further, the "PDCCH with which the DCI format, to which CRC parity bits are attached, is transmitted", the "PDCCH including CRC parity bits and including the DCI format", the "PDCCH including CRC parity bits", and the "PDCCH including the DCI format" may be identical to each other. Furthermore, the "PDCCH including X" and the "PDCCH with X" may be identical to each other. The terminal apparatus 1 may monitor the DCI formats. The terminal apparatus 1 may monitor the DCI. The terminal apparatus 1 may monitor the PDCCHs.

The terminal apparatus 1 attempts to decode the DCI format to which the CRC parity bits scrambled by the RNTI are attached, and detects, as a DCI format destined for the terminal apparatus 1 itself, the DCI format for which the CRC has been successful (also referred to as blind decoding). In other words, the terminal apparatus 1 may detect the PDCCH with the CRC scrambled by the RNTI. The terminal apparatus 1 may detect the PDCCH including the DCI format to which the CRC parity bits scrambled by the RNTI are attached.

Here, the RNTI may include a Cell-Radio Network Temporary Identifier (C-RNTI). For example, the C-RNTI may be an identifier unique to the terminal apparatus 1 and used for the identification in RRC connection and scheduling. The C-RNTI may be used for dynamically scheduled unicast transmission.

The RNTI may further include a Semi-Persistent Scheduling C-RNTI (SPS C-RNTI). For example, the SPS C-RNTI is an identifier unique to the terminal apparatus 1 and used for semi-persistent scheduling. The SPS C-RNTI may be used for semi-persistently scheduled unicast transmission. Here, the semi-persistently scheduled transmission may include meaning of periodically scheduled transmission.

The RNTI may include a Random Access RNTI (RA-RNTI). For example, the RA-RNTI may be an identifier used for transmission of a random access response message. In other words, the RA-RNTI may be used for the transmission of the random access response message in a random access procedure. For example, the terminal apparatus 1 may monitor the PDCCH with the CRC scrambled with the RA-RNTI after the transmission of a random access preamble. The terminal apparatus 1 may receive a random access response on the PDSCH based on detection of the PDCCH with the CRC scrambled with the RA-RNTI.

RNTI may include a Temporary C-RNTI. For example, the Temporary C-RNTI may be an identifier unique to the preamble transmitted by the terminal apparatus 1 and used during a contention base random access procedure. The temporary C-RNTI may be used for dynamically scheduled transmission.

The RNTI may further include a Paging RNTI (P-RNTI). For example, the P-RNTI may be an identifier used for paging and notification of system information modification. For example, the P-RNTI may be used for paging and transmission of a system information message. For example, the terminal apparatus 1 may receive paging on the PDSCH based on detection of the PDCCH with the CRC scrambled by the P-RNTI.

The RNTI may further include a System Information RNTI (SI-RNTI). For example, the SI-RNTI may be an identifier used for broadcast of the system information. For example, the SI-RNTI may be used for transmission of the system information message. For example, the terminal apparatus 1 may receive the system information message on the PDSCH based on detection of the PDCCH with the CRC scrambled with the SI-RNTI.

Here, the PDCCH with the CRC scrambled by the C-RNTI may be transmitted in the USS or CSS. The PDCCH with the CRC scrambled by the RA-RNTI may be transmitted only in the CSS. The PDCCH with the CRC scrambled by the P-RNTI may be transmitted only in the CSS. The PDCCH with the CRC scrambled by the may be transmitted only in the CSS. The PDCCH with the CRC scrambled by the Temporary C-RNTI may be transmitted only in the CSS.

The PDSCH is used for transmission of downlink data (Downlink Shared CHannel (DL-SCH)). The PDSCH may be used to transmit a random access response grant. Here, the random access response grant is used for the scheduling of the PUSCH in the random access procedure. The random access response grant is indicated to the physical layer by a higher layer (e.g., MAC layer).

The PDSCH is used to transmit a system information message. Here, the system information message may be cell-specific information (information unique to a cell). The system information may be included in RRC signaling. The PDSCH may be used to transmit the RRC signaling and the MAC control element.

Further, the PDSCH may be used for transmission of the second UL grant. For example, the terminal apparatus 1 may receive (detect) the second UL grant (information included in the second UL grant) on the PDSCH scheduled by the base station apparatus 3.

The PMCH is used for transmission of multicast data (Multicast CHannel (MCH)).

In FIG. 1, the following downlink physical signals are used for downlink radio communication. Here, the downlink physical signals are not used to transmit the information output from the higher layers but are used by the physical layer.

Synchronization signal (SS)
Downlink Reference Signal (DL RS)

The Synchronization signal is used in order for the terminal apparatus 1 to be synchronized to frequency and time domains in the downlink. In the TDD scheme, the synchronization signal is mapped to subframes 0, 1, 5, and 6 within a radio frame. In the FDD scheme, the synchronization signal is mapped to subframes 0 and 5 within a radio frame.

The Downlink Reference Signal is used in order for the terminal apparatus 1 to perform channel compensation on a downlink physical channel. The downlink reference signal is used in order for the terminal apparatus 1 to obtain the downlink channel state information.

According to the present embodiment, the following five types of downlink reference signals are used.

Cell-specific Reference Signal (CRS)
UE-specific Reference Signal (URS) associated with the PDSCH
Demodulation Reference Signal (DMRS) associated with the EPDCCH
Non-Zero Power Chanel State Information-Reference Signal (NLP CSI-RS)
Zero Power Chanel State Information-Reference Signal (LP CSI-RS)
Multimedia Broadcast and Multicast Service over Single Frequency Network Reference Signal (MBSFN RS)
Positioning Reference Signal (PRS)

Here, the downlink physical channel and the downlink physical signal are also collectively referred to as a downlink signal. The uplink physical channel and the uplink physical signal are also collectively referred to as an uplink signal. The downlink physical channel and the uplink physical channel are also collectively referred to as a physical channel. The downlink physical signals and the uplink physical signals are also collectively referred to as physical signals.

The BCH, the MCH, the UL-SCH, and the DL-SCH are transport channels. A channel used in a Medium Access Control (MAC) layer is referred to as a transport channel. A unit of the transport channel used in the MAC layer is also referred to as a transport block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword and subjected to coding processing on a codeword-by-codeword basis.

Figure 2:
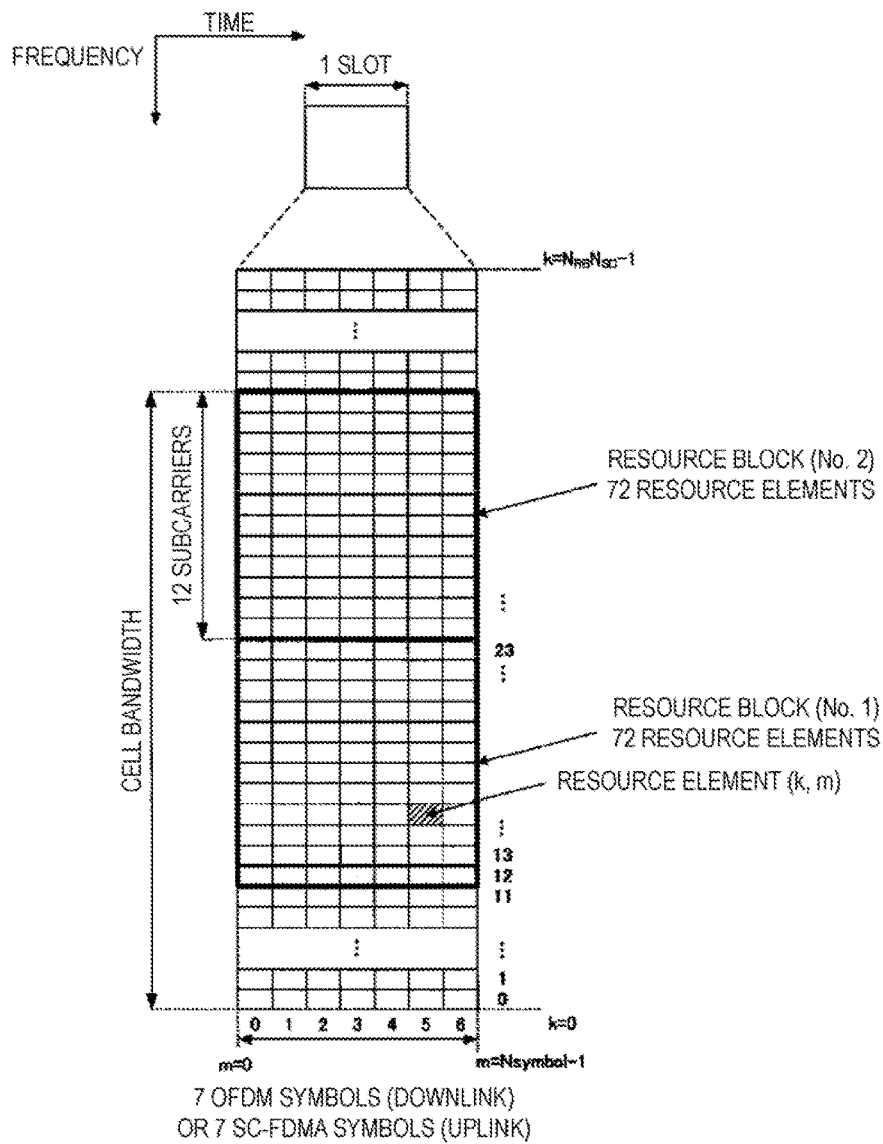
FIG. 2 is a diagram illustrating a configuration of a radio resource according to the present embodiment.
Figure 2:
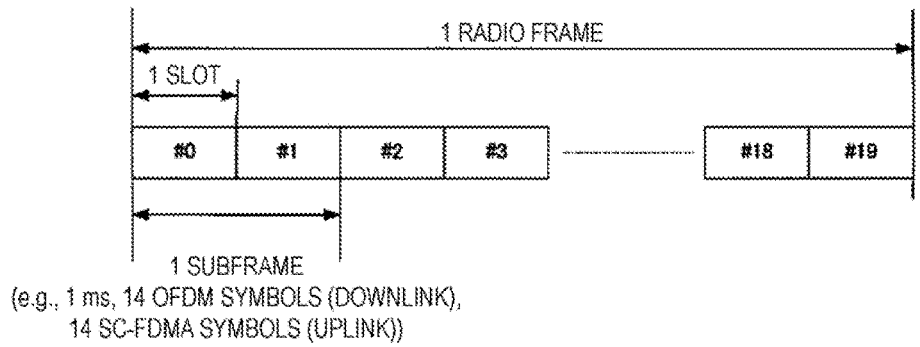

FIG. 2 is a diagram illustrating the configuration of the slot according to the present embodiment. Here, a normal Cyclic Prefix (CP) may apply to an OFDM symbol. Alternatively, an extended Cyclic Prefix (CP) may apply to the OFDM symbol. The physical signal or physical channel transmitted in each of the slots may be expressed by a resource grid.

Here, in the downlink, the resource grid may be defined with multiple subcarriers and multiple OFDM symbols. In the uplink, the resource grid may be defined with multiple subcarriers and multiple SC-FDMA symbols. Each element within the resource grid is referred to as a resource element.

Here, the resource element may be expressed with a frequency-domain index (k) and a time-domain index (m). in other words, the resource element may be identified by a subcarrier number (frequency-domain index (k)) and an OFDM symbol or SC-FDMA symbol number (time-domain index (m)).

That is, in the downlink, in a case that a size of a resource block in the frequency domain expressed as the number of subcarriers is taken as $N_{SC}$, and a configuration of a downlink bandwidth expressed as a multiple of $N_{SC}$ is taken as $N_{RB}$, a subcarrier number may be represented as k=0, . . . , $N_{RB}N_{SC}-1$. Further, in the uplink, in a case that a size of a resource block in the frequency domain expressed as the number of subcarriers is taken as $N_{SC}$, and a configuration of an uplink bandwidth expressed as a multiple of $N_{SC}$ is taken as $N_{RB}$, a subcarrier number may be represented as k=0, . . . , $N_{RB}N_{SC}-1$.

In a case that an OFDM symbol number in one downlink slot is taken as $N_{symbol}$, the OFDM symbol number may be represented as m=0, . . . , $N_{symbol}-1$. In a case that an SC-FDMA symbol number in one uplink slot is taken as $N_{symbol}$, the SC-FDMA symbol number may be represented as m=0, . . . , $N_{symbol}-1$.

Here, a resource block may be used to express mapping of a certain physical channel (PDSCH, PUSCH, or the like) to resource elements. One physical resource block may be defined with seven consecutive OFDM symbols or SC-FDMA symbols in the time domain and 12 consecutive subcarriers in the frequency domain. Thus, one physical resource block may include (7×12) resource elements. Furthermore, one physical resource block may correspond to one slot in the time domain and correspond to 180 kHz in the frequency domain.

One radio frame may be constituted of 20 slots numbered from #0 to #19. For example, one radio frame may be 10 ms. One subframe may be constituted of two consecutive slots. For example, one subframe may be 1 ms, and a subframe n may be constituted of slots 2n and 2n+1. That is, one subframe in the downlink may be 1 ms, and may be constituted of 14 OFDM symbols. One subframe in the uplink may be 1 ms, and may be constituted of 14 SC-FDMA symbols.

For example, one subframe in the downlink may be constituted of 14 OFDM symbols. In the downlink, one slot may be constituted of 7 OFDM symbols. Further, in the uplink, one subframe may be constituted of 14 SC-FDMA symbols. In the uplink, one slot may be constituted of 14 SC-FDMA symbols.

Here, a Transmission Time Interval (TTI) may be defined for the transmission in the downlink and/or the transmission in the uplink. In other words, the transmission in the downlink and/or the transmission in the uplink may be performed at one Transmission Time Interval (at a length of one Transmission Time Interval).

For example, in the downlink, the Transmission Time Intervals of lengths of 1, 2, 3, 4, 5 (one slot), 6, 7, 8, 9, 10, 11, 12, 13, and/or 14 (one subframe) may be defined. In other words, in the downlink, the lengths of the Transmission Time intervals may be 1, 2, 3, 4, 5 (one slot), 6, 7, 8, 9, 10, 11, 12, 13, and/or 14 (one subframe) OFDM symbols.

Further, in the uplink, the Transmission Time intervals of lengths of 1, 2, 3, 4, 5 (one slot), 6, 7, 8, 9, 10, 11, 12, 13, and/or 14 (one subframe) may be defined. in other words, in the uplink, the lengths of the Transmission Time Intervals may be 1, 2, 3, 4, 5 (one slot), 6, 7, 8, 9, 10, 11, 12, 13, and/or 14 (one subframe) SC-FDMA symbols.

Hereinafter, the random access procedure will be described.

The random access procedure includes two random access procedures of a Contention based Random Access procedure and a Non-contention based Random access procedure. The Contention based Random Access procedure is such random access that collisions may occur among multiple terminal apparatuses 1.

The Non-contention based Random Access procedure is such random access that collisions do not occur among the multiple terminal apparatuses 1. For example, in the Non-contention based Random Access procedure, the base station apparatus 3 can allocate a random access preamble to the terminal apparatus 1 in such a manner that collision will not occur.

Hereinafter, the Contention based Random Access procedure will be described. The terminal apparatus 1 may acquire a system information block type 2 (SIB2) transmitted by the base station apparatus 3. The SIB2 may be a configuration common to all the terminal apparatuses 1 (or multiple terminal apparatuses 1) in a cell (common information). For example, the common configuration may include a configuration of the PRACH.

The terminal apparatus 1 may randomly select a random access preamble number. Further, the terminal apparatus 1 may transmit the random access preamble with the selected number (message 1) to the base station apparatus 3 using the PRACH. The base station apparatus 3 may estimate a transmission timing of the uplink using the random access preamble.

In addition, the base station apparatus 3 may transmit a random access response (message 2) using the PDSCH. The random access response may include multiple pieces of information with respect to the random access preamble detected by the base station apparatus 3. For example, the multiple pieces of information may include the random access preamble number, the Temporary C-RNTI, a Timing Advance Command (TA Command), and the random access response grant. In other words, the temporary C-RNTI may be included in the random access response. Further, the random access response grant may be included in the random access response.

The terminal apparatus 1 may transmit uplink data (message 3) on the PUSCH scheduled using the random access response grant (initial transmission of uplink data may be performed). Here, the uplink data may include an identifier (InitialUE-Identity or information indicating the C-RNTI) to identify the terminal apparatus 1.

In a case that the decoding of the uplink data has been unsuccessful, the base station apparatus 3 may indicate to retransmit the uplink data using the DCI format to which the CRC parity bits scrambled by the Temporary C-RNTI are attached. The terminal apparatus 1 may retransmit the uplink data (the same uplink data) on the PUSCH scheduled using the DCI format to which the CRC parity bits scrambled by the Temporary C-RNTI are attached.

In the case that the decoding of the uplink data has been unsuccessful, the base station apparatus 3 may indicate to retransmit the uplink data using the PHICH (NACK). The terminal apparatus 1, when indicated to retransmit the uplink data with the NACK, may retransmit the uplink data (the same uplink data) on the PUSCH.

Here, in the case that the base station apparatus has succeeded in decoding the uplink data to acquire the uplink data, the base station apparatus can understand which of the terminal apparatuses 1 transmitted the random access preamble and the uplink data. In other words, the base station apparatus 3, before it succeeds in decoding the uplink data, cannot understand which of the terminal apparatuses 1 transmitted the random access preamble and the uplink data.

In a case that the base station apparatus 3 receives the message 3 including the InitialUE-Identity, it may transmit, to the terminal apparatus 1, a contention resolution identity (message 4) generated based on the received InitialUE-Identity using the PDSCH. The terminal apparatus 1, in a case that the received contention resolution identity matches the transmitted InitialUE-Identity, (1) assumes that the contention resolution of the random access preamble has been successful, (2) sets the value of the Temporary C-RNTI to the C-RNTI, (3) discards the Temporary C-RNTI, and (4) may assume that the random access procedure has been finished correctly.

The base station apparatus 3, in a case that it has received the message 3 including information indicating the C-RNTI, may transmit, to the terminal apparatus 1, a DCI format (message 4) to which the CRC parity bits scrambled by the received C-RNTI are attached. The terminal apparatus 1, in a case that it has decoded the DCI format to which the CRC parity bits scrambled by the C-RNTI are attached, (1) assumes that the contention resolution of the random access preamble has been successful, (2) discards the Temporary C-RNTI, and (3) may assume that the random access procedure has been finished correctly.

In other words, the base station apparatus 3 may schedule the PUSCH using the random access response grant, as part of the contention based random access procedure.

The terminal apparatus 1 may transmit uplink data (message 3) on the PUSCH scheduled using the random access response grant (initial transmission). In other words, the terminal apparatus 1 may perform the transmission on the PUSCH corresponding to the random access response grant, as part of the contention based random access procedure.

The base station apparatus 3 may schedule the PUSCH using the DCI format to which the CRC scrambled by the Temporary C-RNTI are attached, as part of the contention based random access procedure. In addition, the base station apparatus 3 may schedule or indicate transmission on the PUSCH using the PHICH (NACK), as part of the contention based random access procedure.

The terminal apparatus 1 may transmit (retransmit) the uplink data (message 3) on the PUSCH scheduled using the DCI format to which the CRC scrambled by the Temporary C-RNTI are attached. The terminal apparatus 1 may transmit (retransmit) the uplink data (message 3) on the PUSCH scheduled in accordance with the reception of the PHICH. In other words, the terminal apparatus 1 may perform the transmission on the PUSCH corresponding to the retransmission of the same uplink data (transport block), as part of the contention based random access procedure.

Figure 3:
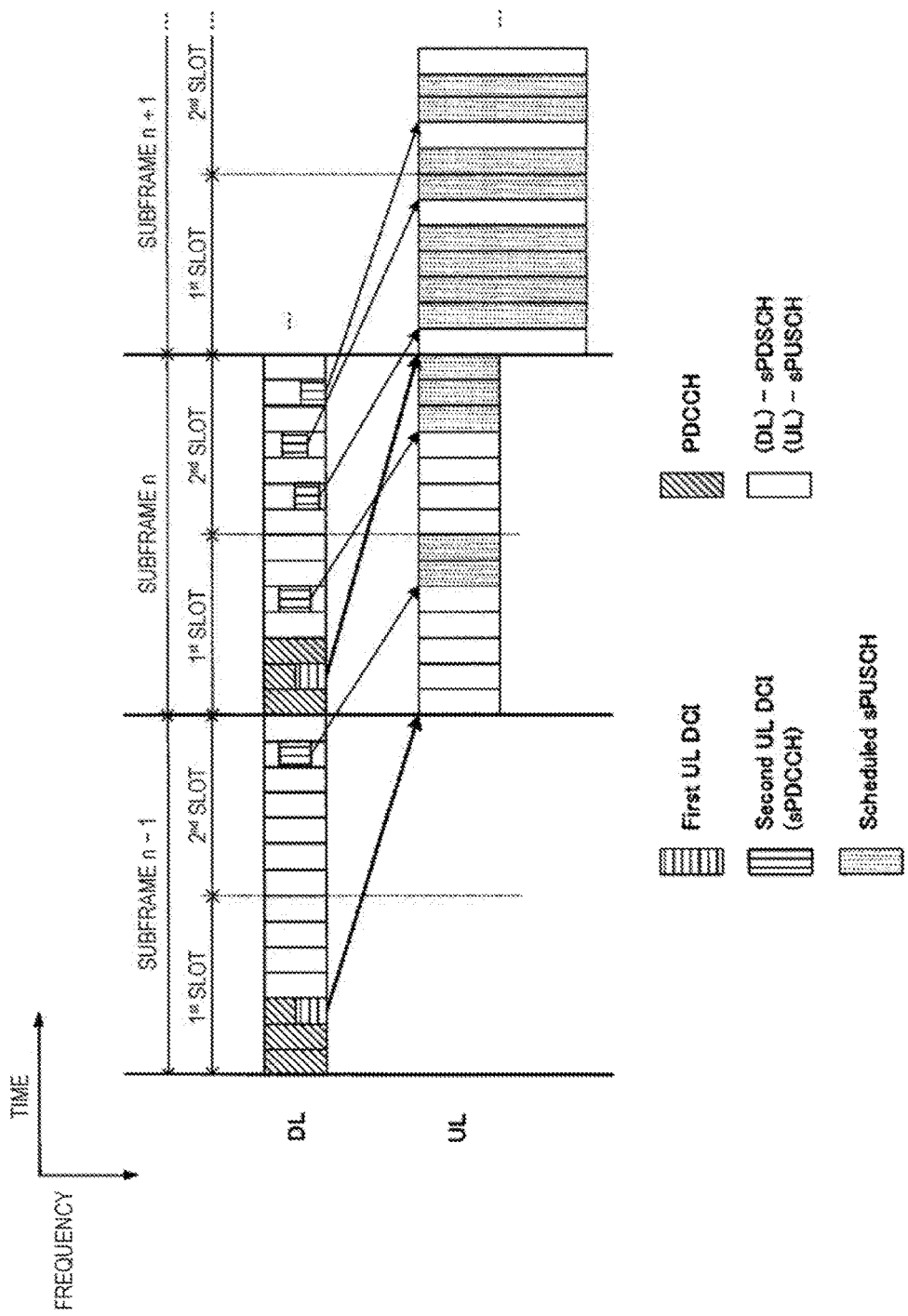
FIG. 3 is a diagram illustrating an uplink data transmission method according to the present embodiment.

FIG. 3 is a diagram illustrating an uplink data transmission method according to the present embodiment. As discussed above, one subframe may be constituted of two consecutive slots (1st slot, 2nd slot), One slot may be constituted of seven OFDM symbols (downlink) or seven SC-FDMA symbols (uplink).

For example, the base station apparatus 3 may transmit the first UL grant at the third symbol (OFDM symbol) in the 1st slot of a subframe n−1. Here, the base station apparatus 3 may configure a subframe and/or a symbol (OFDM symbol) for the terminal apparatus 1 to monitor the first UL grant. For example, the base station apparatus 3 may transmit, using higher layer signaling, information to be used to configure the subframe and/or the symbol (OFDM symbol) for the terminal apparatus 1 to monitor the first UL grant.

Here, the first UL grant may be valid for a subframe next to the subframe where the first UL grant has been received. For example, the first UL grant received in the subframe n−1 may indicate a configuration for a subframe n. Further, the first UL grant received in the subframe n−1 may be used to indicate a bandwidth (frequency resource) for the PUSCH, sPUSCH, and/or sPDCCH used in the subframe n.

For example, the base station apparatus 3 may transmit the second UL grant at the sixth symbol (SC-FDMA symbol) in the 2nd slot of the subframe n−1. Here, the second UL grant may be transmitted with the sPDCCH. For example, using the second UL grant, the PUSCH (sPUSCH) at the sixth and seventh symbols (SC-TDMA symbols) the 1st slot of the subframe n may be scheduled.

In other words, using the second UL grant, transmission on the PUSCH at the Transmission Time Interval of a length of two (two SC-FDMA symbols) may be scheduled. That is, the terminal apparatus 1 may perform, based on the scheduling by the base station apparatus 3, the transmission on the PUSCH (sPUSCH) at the sixth and seventh symbols (SC-FDMA symbols) in the 1st slot of the subframe n.

Likewise, as illustrated in FIG. 3, the base station apparatus 3 may schedule transmission on the PUSCH (sPUSCH) using the first UL grant and/or the second UL grant, while the terminal apparatus 1 may perform the transmission on the PUSCH (sPUSCH) based on the scheduling by the base station apparatus 3.

FIG. 4 is a diagram illustrating an uplink data transmission method according to the present embodiment. In FIG. 4, "R" indicates transmission of a DMRS, and "D" indicates transmission of uplink data. In other words, R in FIG. 4 indicates an SC-FDMA symbol including a DMRS associated with the transmission on the PUSCH (sPUSCH). Further, D in FIG. 4 indicates an SC-FDMA symbol including the uplink data.

Furthermore, the Downlink Control Information (TTI index) illustrated in FIG. 4 may be included in the second UL grant. In other words, the base station apparatus 3 may transmit the TTI index using the second UL grant. The terminal apparatus 1 may perform the transmission on the PUSCH (sPUSCH) based on the TTI index included in the second UL grant.

For example, the TTI index may be used to indicate a length of the Transmission Time Interval for the transmission on the PUSCH (sPUSCH). The TTI index may be used to indicate a position of the DMRS to be transmitted along with the PUSCH (sPUSCH). In addition, the TTI index may be used to indicate a value of a cyclic shift of the DMRS to be transmitted along with the PUSCH (sPUSCH). The TTI index may be used to indicate an offset (the value of an offset) of a delay (delay time) for the transmission on the PUSCH (sPUSCH) based on the reception (detection) of the second UL grant.

In FIG. 4, it is illustrated that, based on one value set in a field to which the TTI index is mapped, a length of the Transmission Time Interval for the transmission on the PUSCH (sPUSCH), a position of the DMRS to be transmitted along with the PUSCH (sPUSCH), a value of the cyclic shift of the DMRS to be transmitted along with the PUSCH (sPUSCH), and a delay offset for the transmission on the PUSCH (sPUSCH) based on the reception of the second UL grant are indicated.

Here, it goes without saying that fields to which each of the pieces of information used for the indication of the length of the Transmission Time interval for the transmission on the PUSCH (sPUSCH), the position of the DMRS to be transmitted along with the PUSCH (sPUSCH), the value of the cyclic shift of the DMRS to be transmitted along with the PUSCH (sPUSCH), and the delay offset for the transmission on the PUSCH (sPUSCH) based on the reception of the second UL grant is mapped, may be defined respectively.

For example, as illustrated in FIG. 4, in a case that "13" is set as a value of the TTI index, the transmission on the PUSCH (sPUSCH) at the Transmission Time Interval of a length of 4 (four SC-FDMA symbols) may be indicated. In the case that "13" is set as a value of the TTI index, the third SC-FDMA symbol may be indicated as a position of the DMRS (the third SC-FDMA symbol may be indicated as an SC-FDMA symbol including the DMRS).

In the case that "13" is set as a value of the TTI index, "4" may be indicated as a value of the cyclic shift applied to the DMRS. In the case that "13" is set as a value of the TTI index, "0 (zero SC-TDMA symbols)" may be indicated as a delay offset for the transmission on the PUSCH (sPUSCH) based on the reception of the second UL grant.

Likewise, in a case that "14" is set as a value of the TTI index, "2 (two SC-FDMA symbols)" may be indicated as a delay offset for the transmission on the PUSCH (sPUSCH) based on the reception of the second UL grant. In other words, it may be indicated that the transmission (a position of the first symbol (SC-FDMA symbol) for the transmission) on the PUSCH (sPUSCH) based on the reception of the second UL grant is delayed by "2 (two SC-IDMS symbols)".

Here, the length of the Transmission Time Interval for the transmission on the PUSCH (sPUSCH), the position of the DMRS to be transmitted along with the PUSCH (sPUSCH), the value of the cyclic shift of the DMRS to be transmitted along with the PUSCH (sPUSCH), and/or the delay offset for the transmission on the PUSCH (sPUSCH) based on the reception of the second UL grant may be configured using information included in higher layer signaling (e.g., signaling in the RRC layer).

Multiple values (e.g., four values) indicating the length of the Transmission Time interval for the transmission on the PUSCH (sPUSCH) may be configured using information included in higher layer signaling, and one of the above multiple values may be indicated using information included in the second UL grant (e.g., two-bit information).

Multiple values (e.g., four values) indicating the position of the DMRS transmitted along with the PUSCH (sPUSCH) may be configured using information included in higher layer signaling, and one of the above multiple values may be indicated using the information included in the second UL grant (e.g., two-bit information).

Multiple values (e.g., four values) indicating the value of the cyclic shift of the DMRS transmitted along with the PUSCH (sPUSCH) may be configured using information included in higher layer signaling, and one of the above multiple values may be indicated using the information included in the second UL grant (e.g., two-bit information).

Further, multiple values (e.g., four values) indicating a delay offset for the transmission on the PUSCH (sPUSCH) based on the reception of the second UL grant may be configured using information included in higher layer signaling, and one of the above multiple values may be indicated using the information included in the second UL grant (e.g., two-bit information).

In addition, a set of multiple values (e.g., a set of four values) indicating a length of the Transmission Time Interval for the transmission with the PUSCH (sPUSCH), a position of the DMRS to be transmitted along on the PUSCH (sPUSCH), a value of the cyclic shift of the DMRS to be transmitted along with the PUSCH (sPUSCH), and/or a delay offset for the transmission on the PUSCH (sPUSCH) based on the reception of the second UL grant may be configured using information included in higher layer signaling, and one set among the sets of multiple values may be indicated using information included in the second UL grant (e.g., two-bit information).

In other words, one value that is set in the information included in the second UL grant (e.g., two-bit information) may indicate the length of the Transmission Time Interval for the transmission on the PUSCH (sPUSCH), the position of the DMRS to be transmitted along with the PUSCH (sPUSCH), the value of the cyclic shift of the DMRS to be transmitted along with the PUSCH (sPUSCH), and/or the delay offset for the transmission on the PUSCH (sPUSCH) based on the reception of the second UL grant.

FIG. 5 is a diagram illustrating an uplink data transmission method according to the present embodiment. As illustrated in FIG. 5, for a length of each of Transmission Time intervals at which the transmission on the PUSCH (sPUSCH) is performed, a fixed delay (fixed delay time) may be defined between the first symbol of an UL grant (e.g., the second UL grant) and the first symbol where the transmission on the PUSCH (sPUSCH) is performed.

For example, as a fixed delay between the first symbol of the UL grant (e.g., the second UL grant) and the first symbol where the transmission on the PUSCH (sPUSCH) is performed, a value obtained by multiplying the length of the Transmission Time interval by four may be defined. Here, for example, the fixed delays may be defined by a specification or the like, and may be known values between the base station apparatus 3 and the terminal apparatus 1.

In other words, for example, in a case that an UL grant (e.g., the first symbol of the second UL grant) is detected in a symbol (OFDM symbol) "n", the transmission on the PUSCH (sPUSCH) may be performed in a symbol (SC-FDMA symbol) "n+8" at the Transmission Time Interval of a length of two (two SC-FDMA symbols).

Likewise, as illustrated in FIG. 5, the transmission on the PUSCH (sPUSCH) may be performed with a fixed delay defined corresponding to each of the lengths of the Transmission Time Intervals. Here, as discussed above, the base station apparatus 3 may indicate a delay offset for the transmission on the PUSCH (sPUSCH) based on the reception of the second UL grant.

In other words, for example, in a case that an UL grant (e.g., the first symbol of the second UL grant) is detected in a symbol (OFDM symbol) "n" and "2" (two SC-FDMA symbols) is indicated as a delay offset, the transmission on the PUSCH (sPUSCH) may be performed in a symbol (SC-FDMA symbol) "n+10" at the Transmission Time Interval of a length of two (two SC-FDMA symbols).

In other words, the fixed delay between the first symbol of the UL grant (e.g., the second UL grant) and the first symbol where the transmission on the PUSCH (sPUSCH) is performed may be defined as a minimum delay between the first symbol of the UL grant (e.g., the second UL grant) and the first symbol where the transmission on the PUSCH (sPUSCH) is performed.

In addition, the fixed delay between the first symbol of the UL grant (e.g., the second UL grant) and the first symbol where the transmission on the PUSCH (sPUSCH) is performed may be defined as the minimum number/amount of symbols before an UL HARQ retransmission is expected by the terminal apparatus 1.

Here, the base station apparatus 3 may configure transmission with the PUSCH (sPUSCH) at a Transmission Time Interval of a length shorter than (or equal to or shorter than) 1 ms (14 SC-FDMA symbols) for the terminal apparatus 1. Hereinafter, operation of the base station apparatus 3 in which the transmission on the PUSCH (sPUSCH) at a Transmission Time interval of a length shorter than (or equal to or shorter than) 1 ms (14 SC-FDMA symbols) is configured, is also described as the base station apparatus 3 configuring short Transmission Time Interval (sTTI) transmission.

The configuration of the sTTI transmission may include configuring the transmission on the PUSCH (sPUSCH) based on the first UL grant and/or the second UL grant. The configuration of the sTTI transmission may include configuring operation of the terminal apparatus 1 to monitor the first UL grant and/or the second UL grant. Further, the configuration of the sTTI transmission may include configuring a subframe for the terminal apparatus 1 to monitor the first UL grant and/or the second UL grant.

For example, the base station apparatus 3 may transmit higher layer signaling that includes information associated with the configuration of the sTTI transmission (e.g., signaling in the RRC layer). The base station apparatus 3 may configure sTTI transmission for each serving cell, in the case that the sTTI transmission is configured, the terminal apparatus 1 may perform transmission with the PUSCH (sPUSCH) at a Transmission Time Interval of a length shorter than (or equal to or shorter than) 1 ms (14 SC-FDMA symbols), as discussed above.

Figure 6:
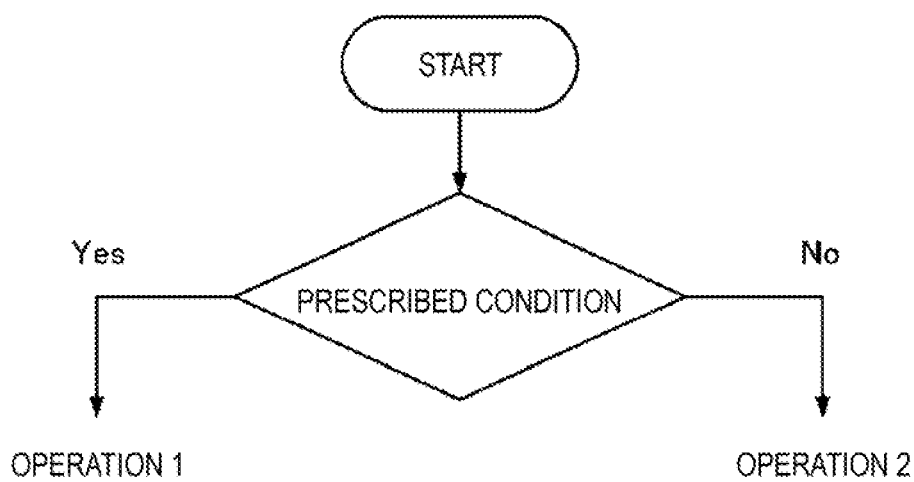
FIG. 6 is another diagram illustrating an uplink data transmission method according to the present embodiment.

FIG. 6 is a diagram illustrating an uplink data transmission method according to the present embodiment. Basically, operations of the terminal apparatus 1 will be described below. However, it goes without saying that the base station apparatus 3 performs similar operations in response to the operations of the terminal apparatus 1.

As illustrated in FIG. 6, the terminal apparatus 1 may perform switching between operation 1 and operation 2 based on a predetermined condition. In other words, the terminal apparatus 1 may perform the operation 1 in a case of the predetermined condition being satisfied. For example, in the case of the predetermined condition being satisfied, the terminal apparatus 1 may perform the operation 1 regardless of whether or not sTTI transmission is configured. Meanwhile, the terminal apparatus 1 may perform the operation 2 in a case of the predetermined condition being unsatisfied. In other words, the terminal apparatus 1 may perform the operation 2 except for the case of the predetermined condition being satisfied.

Here, the operation 1 may include transmission on the PUSCH at a Transmission Time Interval of a length of 1 ms. Here, the operation 1 may include transmission on the PUSCH at a Transmission Time Interval of a length of 14 SC-FDMA symbols. Further, the operation 1 may include transmission on the PUSCH in a subframe which appears, after four subframes having passed, following the subframe in which the corresponding UL grant was received (detected). That is, the operation 1 may include transmission on the PUSCH at a timing (transmission timing) based on the subframe in which the corresponding UL grant was received (detected).

Further, the operation 1 may include transmission with a DMRS in the fourth SC-FDMA symbol of a slot associated with the transmission on the PUSCH. In other words, in the operation 1, the DMRS associated with the transmission on the PUSCH may be included in the fourth SC-FDMA symbol of the slot associated with the transmission on the PUSCH.

That is, in the operation 1, the length of a Transmission Time Interval for the transmission on the PUSCH may be 1 ms (or 14 SC-FDMA symbols). Here, in the operation 1, a bandwidth (frequency resource, physical resource block) for the transmission on the PUSCH may be scheduled using the third UL grant and/or the random access response grant.

In addition, in the operation 1, the minimum number/amount of symbols before an UL HARQ retransmission is expected by the terminal apparatus 1 may be 56 symbols. In other words, in the operation 1, the minimum number/amount of symbols before the UL HARQ retransmission is expected by the terminal apparatus 1 may be equal to a value obtained by multiplying the number of SC-FDMA symbols included in the Transmission Time Interval of a length of 1 ms (that is, 14) by 4.

The operation 2 may include transmission on the PUSCH (sPUSCH) at a Transmission Time interval of a length shorter than (or equal to or shorter than) 1 ms. The operation 2 may include transmission on the PUSCH (sPUSCH) at a Transmission Time Interval of a length shorter than (or equal to or shorter than) 14 SC-FDMA symbols.

Further, the operation 2 may include transmission on the PUSCH (sPUSCH) at a timing (transmission timing) indicated using the corresponding UL grant (e.g., the second UL grant). In other words, the operation 2 may include transmission on the PUSCH (sPUSCH) at a timing (transmission timing) indicated based on a value (an information value) that is set in a field to which information included in the corresponding UL grant (e.g., the second UL grant) is mapped. As discussed above, the terminal apparatus 1 may determine a transmission timing with the PUSCH (sPUSCH) based on the information value included in the corresponding UL grant (e.g., the second UL grant).

In addition, the operation 2 may include transmission with a DMRS at a position indicated based on the information value included in the corresponding UL grant (e.g., the second UL grant). In other words, in the operation 2, the DMRS associated with the transmission on the PUSCH (sPUSCH) may be included in an SC-FDMA symbol indicated based on the information value included in the second UL grant in a slot associated with the transmission on the PUSCH (sPUSCH). As discussed above, the terminal apparatus 1 may determine a position of the DMRS in the transmission on the PUSCH (sPUSCH) based on the information value included in the corresponding UL grant (e.g., the second UL grant).

Further, the operation 2 may include transmission on the PUSCH (sPUSCH) based on the first UL grant and/or the second UL grant. That is, in the operation 2, the length of a Transmission Time Interval for the transmission on the PUSCH (sPUSCH) may be indicated by the base station apparatus 3. That is, in the operation 2, the length of the Transmission Time Interval for the transmission on the PUSCH (sPUSCH) may be indicated using information (information value) included in the second UL grant.

In addition, in the operation 2, a bandwidth (frequency resource, physical resource block) for the transmission on the PUSCH (sPUSCH) may be scheduled by the base station apparatus 3. In other words, in the operation 2, the bandwidth (frequency resource, physical resource block) for the transmission on the PUSCH (sPUSCH) may be scheduled based on the first UL grant (information (information value) included in the first UL grant).

In the operation 2, the minimum number/amount of symbols before an UL HARQ retransmission is expected by the terminal apparatus 1 may be at least based on indication by the base station apparatus 3. That is, in the operation 2, the minimum number/amount of symbols before the UL HARQ retransmission is expected by the terminal apparatus 1 may be based on the length of a Transmission Time Interval indicated at least based on the second UL grant (the information (information value) included in the second UL grant).

Further, in the operation 2, the minimum number/amount of symbols before the UL HARQ retransmission is expected by the terminal apparatus 1 may be based on a fixed delay between the first symbol of an UL grant (e.g., the second UL grant) and the first symbol where the transmission on the PUSCH (sPUSCH) is performed. As described above, the fixed delay between the first symbol of the UL grant (e.g., the second UL grant) and the first symbol where the transmission on the PUSCH (sPUSCH) is performed may be shorter than 56 symbols.

Here, in the predetermined condition, at least one of Conditions (1) and (2) below may be included. In other words, the terminal apparatus 1 may perform the operation 1 in a case that at least one of Conditions (1) and (2) below is satisfied. Meanwhile, the terminal apparatus 1 may perform the operation 2 in a case that none of Conditions (1) and (2) below are satisfied. In other words, the terminal apparatus 1 may perform the operation 2 except for a case in which Conditions (1) and (2) below are satisfied.

Condition (1): transmission on the PUSCH corresponds to a random access response grant. Condition (2): transmission on the PUSCH corresponds to a DCI format to which CRC parity bits scrambled by a predetermined RNTI are attached.

In other words, the terminal apparatus 1 may perform the operation 1 in a case that the transmission on the PUSCH corresponds to a random access response grant. Further, the terminal apparatus 1 may perform the operation 1 in a case that the transmission on the PUSCH corresponds to a DCI format to which CRC parity bits scrambled by the predetermined RNTI are attached.

In other words, the terminal apparatus 1 may perform the operation 2, except for a case in which the transmission on the PUSCH corresponds to a random access response grant or a case in which the transmission on the PUSCH corresponds to a DCI format to which CRC parity bits scrambled by the predetermined RNTI are attached. The terminal apparatus 1 may perform the operation 2 except for a case in which the transmission on the PUSCH corresponds to a random access response grant. The terminal apparatus 1 may perform the operation 2 except for a case in which the transmission on the PUSCH corresponds to a DCI format to which CRC parity bits scrambled by the predetermined RNTI are attached.

The predetermined RNTI may include a SPS C-RNTI. That is, the terminal apparatus 1 may perform the operation 1 in a case that the transmission on the PUSCH corresponds to a DCI format to which CRC parity bits scrambled by the SPS C-RNTI are attached.

The predetermined RNTI may include a RA-RNTI. That is, the terminal apparatus 1 may perform the operation 1 in a case that the transmission on the PUSCH corresponds to a DCI format to which CRC parity bits scrambled by the RA-RNTI are attached.

The predetermined RNTI may include a P-RNTI. The terminal apparatus 1 may perform the operation 1 in a case that the transmission on the PUSCH corresponds to a DCI format to which CRC parity bits scrambled by the P-RNTI are attached.

The predetermined RNTI may include a Temporary C-RNTI. The terminal apparatus 1 may perform the operation 1 in a case that the transmission on the PUSCH corresponds to a DCI format to which CRC parity bits scrambled by the Temporary C-RNTI are attached. In other words, the terminal apparatus 1 may perform the operation 1 in a case that the transmission on the PUSCH corresponds to retransmission of the same uplink data (transport block).

In addition, the terminal apparatus 1 may perform the operation 2 in a case that the transmission on the PUSCH corresponds to a DCI format to which CRC parity bits scrambled by a C-RNTI are attached. Here, the DCI format to which the CRC parity bits scrambled by the C-RNTI are attached may include the first UL grant, the second UL grant, and/or the third UL grant.

In other words, the terminal apparatus 1 may perform the operation 2 in a case that the transmission on the PUSCH corresponds to the first UL grant, the second UL grant and/or the third UL grant to which the CRC parity bits scrambled by the C-RNTI are attached.

The terminal apparatus 1 may perform the operation 2 in a case that the transmission on the PUSCH corresponds to a DCI format to which CRC parity bits scrambled by the SPS C-RNTI are attached. Here, the DCI format to which the CRC parity bits scrambled by the SPS C-RNTI are attached may include the first UL grant, the second UL grant, and/or the third UL grant.

In other words, the terminal apparatus 1 may perform the operation 2 in a case that the transmission on the PUSCH corresponds to the first UL grant, the second UL grant and/or the third UL grant to which the CRC parity bits scrambled by the SPS C-RNTI are attached.

Further, the terminal apparatus 1 may perform the operation 2 in a case of having received (detected) the first UL grant and/or the second UL grant. In other words, the terminal apparatus 1 may perform the operation 2 in a case that the transmission on the PUSCH corresponds to the first UL grant and/or the second UL grant.

Structures of apparatuses according to the present embodiment will be described below.

Figure 7:
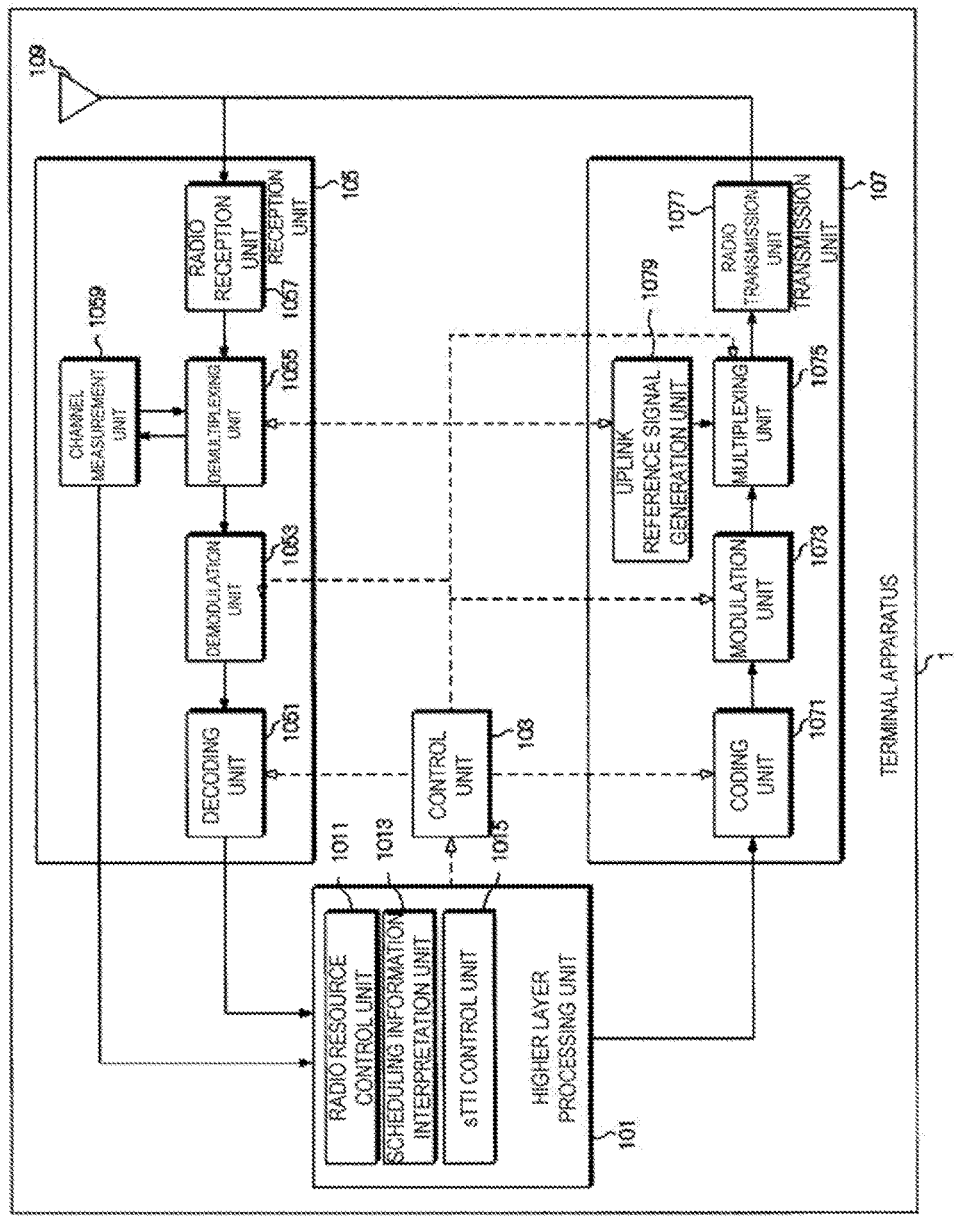
FIG. 7 is a schematic block diagram illustrating a configuration of a terminal apparatus 1 according to the present embodiment.

FIG. 7 is a schematic block diagram illustrating a configuration of the terminal apparatus 1 according to the present embodiment. As illustrated in FIG. 7, the terminal apparatus 1 is configured to include a higher layer processing unit 101, a control unit 103, a reception unit 105, a transmission unit 107, and a transmit and receive antenna 109. The higher layer processing unit 101 is configured to include a radio resource control unit 1011, a scheduling information interpretation unit 1013, and a sTTI control unit 1015, The reception unit 105 is configured to include a decoding unit 1051, a demodulation unit 1053, a demultiplexing unit 1055, a radio reception unit 1057, and a channel measurement unit 1059. The transmission unit 107 is configured to include a coding unit 1071, a modulation unit 1073, a multiplexing unit 1075, a radio transmission unit 1077, and an uplink reference signal generation unit 1079.

The higher layer processing unit 101 outputs the uplink data (the transport block) generated by a user operation or the like, to the transmission unit 107. The higher layer processing unit 101 performs processing of the Medium Access Control (MAC) layer, the Packet Data Convergence Protocol (PDCP) layer, the Radio Link Control (RLC) layer, and the Radio Resource Control (RRC) layer.

The radio resource control unit 1011 included in the higher layer processing unit 101 manages various configuration information/parameters of the terminal apparatus 1 itself. The radio resource control unit 1011 sets the various configuration information/parameters in accordance with higher layer signaling received from the base station apparatus 3. To be more specific, the radio resource control unit 1011 sets the various configuration information/parameters in accordance with the information indicating the various configuration information/parameters received from the base station apparatus 3. Furthermore, the radio resource control unit 1011 generates information to be mapped to each uplink channel, and outputs the generated information to the transmission unit 107. The radio resource control unit 1011 is also referred to as a configuration unit 1011.

Here, the scheduling information interpretation unit 1013 included in the higher layer processing unit 101 interprets the DCI format (scheduling information, UL grant) received through the reception unit 105, generates control information for control of the reception unit 105 and the transmission unit 107, in accordance with a result of interpreting the DCI format, and outputs the generated control information to the control unit 103.

The sTTI control unit 1015 included in the higher layer processing unit 101 performs control operation associated with sTTI transmission, based on various configuration information, and information or conditions regarding the SPS such as parameters.

In accordance with the control information originating from the higher layer processing unit 101, the control unit 103 generates a control signal for control of the reception unit 105 and the transmission unit 107. The control unit 103 outputs the generated control signal to the reception unit 105 and the transmission unit 107 to control the reception unit 105 and the transmission unit 107.

In accordance with the control signal input from the control unit 103, the reception unit 105 demultiplexes demodulates, and decodes a reception signal received from the base station apparatus 3 through the transmit and receive antenna 109, and outputs the information resulting from the decoding, to the higher layer processing unit 101.

The radio reception unit 1057 converts (down-converts) a downlink signal received through the transmit and receive antenna 109 into a baseband signal through orthogonal demodulation, removes unnecessary frequency components, controls an amplification level in such a manner as to suitably maintain a signal level, performs orthogonal demodulation, based on an in-phase component and an orthogonal component of the received signal, and converts the resulting orthogonally-demodulated analog signal into a digital signal. The radio reception unit 1057 removes a portion corresponding to a Cyclic Prefix (CP) from the digital signal resulting from the conversion, performs Fast Fourier Transform (FFT) on the signal from which the CP has been removed, and extracts a signal in the frequency domain.

The demultiplexing unit 1055 demultiplexes the extracted signal into the PHICH, the PDCCH, the PDSCH, and the downlink reference signal. Moreover, the demultiplexing unit 1055 makes a compensation of channels including the PHICH, the PDCCH, and the PDSCH, from a channel estimate input from the channel measurement unit 1059. Furthermore, the demultiplexing unit 1055 outputs the downlink reference signal resulting from the demultiplexing, to the channel measurement unit 1059.

The demodulation unit 1053 multiplies the PHICH by a corresponding code for composition, demodulates the resulting composite signal in compliance with a Binary Phase Shift Keying (BPSK) modulation scheme, and outputs a result of the demodulation to the decoding unit 1051. The decoding unit 1051 decodes the PHICH destined for the terminal apparatus 1 itself and outputs the HARQ indicator resulting from the decoding to the higher layer processing unit 101. The demodulation unit 1053 demodulates the PDCCH in compliance with a QPSK modulation scheme and outputs a result of the demodulation to the decoding unit 1051. The decoding unit 1051 attempts to decode the PDCCH. In a case of succeeding in the decoding, the decoding unit 1051 outputs Downlink Control Information resulting from the decoding and an RNTI to which the Downlink Control Information corresponds, to the higher layer processing unit 101.

The demodulation unit 1053 demodulates the PDSCH in compliance with a modulation scheme notified with the downlink grant, such as Quadrature Phase Shift Keying (QPSK), 16 Quadrature Amplitude Modulation (QAM), or 64 QAM, and outputs a result of the demodulation to the decoding unit 1051. The decoding unit 1051 decodes the data in accordance with information of a coding rate notified with the Downlink Control Information, and outputs, to the higher layer processing unit 101, the downlink data (the transport block) resulting from the decoding.

The channel measurement unit 1059 measures a downlink path loss or a channel state from the downlink reference signal input from the demultiplexing unit 1055, and outputs the measured path loss or channel state to the higher layer processing unit 101. Furthermore, the channel measurement unit 1059 calculates a downlink channel estimate from the downlink reference signal and outputs the calculated downlink channel estimate to the demultiplexing unit 1055. The channel measurement unit 1059 performs channel measurement and/or interference measurement in order to calculate the CQI (or the CSI).

The transmission unit 107 generates the uplink reference signal in accordance with the control signal input from the control unit 103, codes and modulates the uplink data (the transport block) input from the higher layer processing unit 101, multiplexes the PUCCH, the PUSCH, and the generated uplink reference signal, and transmits a result of the multiplexing to the base station apparatus 3 through the transmit and receive antenna 109. Furthermore, the transmission unit 107 transmits Uplink Control Information.

The coding unit 1071 performs coding, such as convolutional coding or block coding, on the Uplink Control Information input from the higher layer processing unit 101. Furthermore, the coding unit 1071 performs turbo coding in accordance with information used for the scheduling of the PUSCH.

The modulation unit 1073 modulates coded bits input from the coding unit 1071, in compliance with the modulation scheme notified with the Downlink Control Information, such as BPSK, QPSK, 16 QAM, or 64 QAM, or in compliance with a modulation scheme predetermined in advance for each channel. In accordance with the information used for the scheduling of the PUSCH, the modulation unit 1073 determines the number of data sequences to be spatial-multiplexed, maps multiple pieces of uplink data to be transmitted on the same PUSCH to multiple sequences through Multiple Input Multiple Output Spatial Multiplexing (MIMO SM), and performs precoding on the sequences.

The uplink reference signal generation unit 1079 generates a sequence acquired in accordance with a rule (formula) predetermined in advance, based on a physical layer cell identifier (also referred to as a Physical Layer Cell Identity (PCI), a Cell ID, or the like) for identifying the base station apparatus 3, a bandwidth to which the uplink reference signal is mapped, a cyclic shift notified with the uplink grant, a parameter value for generation of a DMRS sequence, and the like. In accordance with the control signal input from the control unit 103, the multiplexing unit 1075 rearranges modulation symbols of the PUSCH in parallel and then performs Discrete Fourier Transform (DFT) on the rearranged modulation symbols. Furthermore, the multiplexing unit 1075 multiplexes PUCCH and PUSCH signals and the generated uplink reference signal for each transmit antenna port. To be more specific, the multiplexing unit 1075 maps the PUCCH and PUSCH signals and the generated uplink reference signal to the resource elements for each transmit antenna port.

The radio transmission unit 1077 performs Inverse Fast Fourier Transform (IFFT) on a signal resulting from the multiplexing, generates an SC-FDMA symbol, attaches a CP to the generated SC-FDMA symbol, generates a baseband digital signal, converts the baseband digital signal into an analog signal, removes unnecessary frequency components through a lowpass filter, up-converts a result of the removal into a signal of a carrier frequency, performs power amplification, and outputs a final result to the transmit and receive antenna 109 for transmission.

Figure 8:
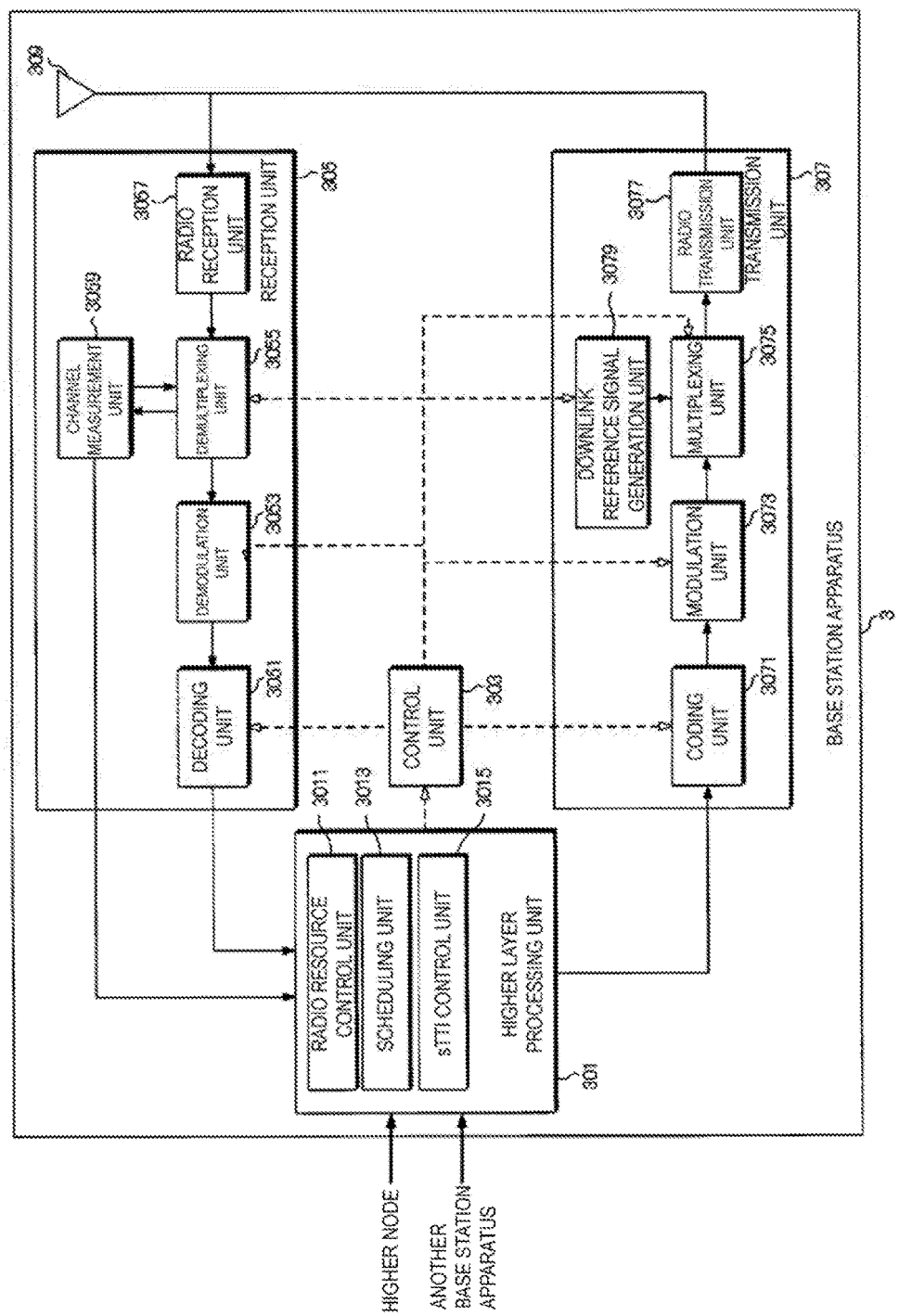
FIG. 8 is a schematic block diagram illustrating a configuration of a base station apparatus 3 according to the present embodiment.

FIG. 8 is a schematic block diagram illustrating a configuration of the base station apparatus 3 according to the present embodiment. As illustrated in the drawing, the base station apparatus 3 is configured to include a higher layer processing unit 301, a control unit 303, a reception unit 305, a transmission unit 307, and a transmit and receive antenna 309. The higher layer processing unit 301 is configured to include a radio resource control unit 3011, a scheduling unit 3013, and a sTTI control unit 3015. The reception unit 305 is configured to include a decoding unit 3051, a demodulation unit 3053, a demultiplexing unit 3055, a radio reception unit 3057, and a channel measurement unit 3059. The transmission unit 307 is configured to include a coding unit 3071, a modulation unit 3073, a multiplexing unit 3075, a radio transmission unit 3077, and a downlink reference signal generation unit 3079.

The higher layer processing unit 301 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates control information for control of the reception unit 305 and the transmission unit 307, and outputs the generated control information to the control unit 303.

The radio resource control unit 3011 included in the higher layer processing unit 301 generates, or acquires from a higher node, the downlink data (the transport block) mapped to the downlink PDSCH, system information, the RRC message, the MAC Control Element (CE), and the like, and outputs a result of the generation or the acquirement to the transmission unit 307. Furthermore, the radio resource control unit 3011 manages various configuration information/parameters for each of the terminal apparatuses 1. The radio resource control unit 3011 may set various configuration information/parameters for each of the terminal apparatuses 1 through higher layer signaling. In other words, the radio resource control unit 1011 transmits/broadcasts information indicating various configuration information/parameters. The radio resource control unit 3011 is also referred to as a configuration unit 3011.

The scheduling unit 3013 included in the higher layer processing unit 301 determines a frequency and a subframe to which the physical channels (PDSCH and PUSCH) are allocated, the coding rate and modulation scheme for the physical channels (PDSCH and PUSCH), the transmit power, and the like, from the received channel state information and from the channel estimate, channel quality, or the like input from the channel measurement unit 3059. The scheduling unit 3013 generates the control information (e.g., the DCI format) in order to control the reception unit 305 and the transmission unit 307 in accordance with a result of the scheduling, and outputs the generated information to the control unit 303. The scheduling unit 3013 further determines timing of performing transmission processing and reception processing.

The sTTI control unit 3015 included in the higher layer processing unit 301 performs control associated with the SPS, based on various configuration information, and information or conditions regarding the SPS such as parameters.

In accordance with the control information originating from the higher layer processing unit 301, the control unit 303 generates a control signal for control of the reception unit 305 and the transmission unit 307. The control unit 303 outputs the generated control signal to the reception unit 305 and the transmission unit 307 to control the reception unit 305 and the transmission unit 307.

In accordance with the control signal input from the control unit 303, the reception unit 305 demultiplexes, demodulates, and decodes the reception signal received from the terminal apparatus 1 through the transmit and receive antenna 309, and outputs information resulting from the decoding to the higher layer processing unit 301. The radio reception unit 3057 converts (down-converts) an uplink signal received through the transmit and receive antenna 309 into a baseband signal through orthogonal demodulation, removes unnecessary frequency components, controls the amplification level in such a manner as to suitably maintain a signal level, performs orthogonal demodulation, based on an in-phase component and an orthogonal component of the received signal, and converts the resulting orthogonally-demodulated analog signal into a digital signal. The reception unit 305 receives the Uplink Control Information.

The radio reception unit 3057 removes a portion corresponding to a Cyclic Prefix (CP) from the digital signal resulting from the conversion. The radio reception unit 3057 performs Fast Fourier Transform (FFT) on the signal from which the CP has been removed, extracts a signal in the frequency domain, and outputs the resulting signal to the demultiplexing unit 3055.

The demultiplexing unit 1055 demultiplexes the signal input from the radio reception unit 3057 into the PUCCH, the PUSCH, and the signal such as the uplink reference signal. The demultiplexing is performed based on radio resource allocation information that is determined in advance by the base station apparatus 3 using the radio resource control unit 3011 and that is included in the uplink grant notified to each of the terminal apparatuses 1. Furthermore, the demultiplexing unit 3055 makes a compensation of channels including the PUCCH and the PUSCH from the channel estimate input from the channel measurement unit 3059. Furthermore, the demultiplexing unit 3055 outputs an uplink reference signal resulting from the demultiplexing, to the channel measurement unit 3059.

The demodulation unit 3053 performs Inverse Discrete Fourier Transform (IDFT) on the PUSCH, acquires modulation symbols, and performs reception signal demodulation, that is, demodulates each of the modulation symbols on the PUCCH and the PUSCH, in compliance with the modulation scheme predetermined in advance, such as Binary Phase Shift Keying (BPSK), QPSK, 16 QAM, or 64 QAM, or in compliance with the modulation scheme that the base station apparatus 3 itself notified in advance with the uplink grant to each of the terminal apparatuses 1. The demodulation unit 3053 demultiplexes the modulation symbols of multiple pieces of uplink data transmitted on the same PUSCH with the MIMO SM, based on the number of spatial-multiplexed sequences notified in advance with the uplink grant to each of the terminal apparatuses 1. and information designating the precoding to be performed on the sequences.

The decoding unit 3051 decodes the coded bits of the PUCCH and the PUSCH, which have been demodulated, at the coding rate in compliance with a coding scheme predetermined in advance, the coding rate being predetermined in advance or being notified in advance with the uplink grant to the terminal apparatus 1 by the base station apparatus 3 itself, and outputs the decoded uplink data and Uplink Control Information to the higher layer processing unit 101. In a case that the PUSCH is re-transmitted, the decoding unit 3051 performs the decoding with the coded bits input from the higher layer processing unit 301 and retained in an HARQ buffer, and the demodulated coded bits. The channel measurement unit 309 measures the channel estimate, the channel quality, and the like, based on the uplink reference signal input from the demultiplexing unit 3055, and outputs a result of the measurement to the demultiplexing unit 3055 and the higher layer processing unit 301.

The transmission unit 307 generates the downlink reference signal in accordance with the control signal input from the control unit 303, codes and modulates the HARQ indicator, the Downlink Control Information, and the downlink data that are input from the higher layer processing unit 301, multiplexes the PINCH, the PDCCH, the PDSCH, and the downlink reference signal, and transmits a result of the multiplexing to the terminal apparatus 1 through the transmit and receive antenna 309.

The coding unit 3071 codes the HARQ indicator, the Downlink Control Information, and the downlink data that are input from the higher layer processing unit 301, in compliance with the coding scheme predetermined in advance, such as block coding, convolutional coding, or turbo coding, or in compliance with the coding scheme determined by the radio resource control unit 3011. The modulation unit 3073 modulates the coded bits input from the coding unit 3071, in compliance with the modulation scheme predetermined in advance, such as BPSK, QPSK, 16 QAM, or 64 QAM, or in compliance with the modulation scheme determined by the radio resource control unit 3011.

The downlink reference signal generation unit 3079 generates, as the downlink reference signal, a sequence that is already known to the terminal apparatus 1 and that is acquired in accordance with a rule predetermined in advance, based on the Physical layer Cell Identifier (PCI) for identifying the base station apparatus 3, and the like. The multiplexing unit 3075 multiplexes the modulated modulation symbol of each channel and the generated downlink reference signal. To be more specific, the multiplexing unit 3075 maps the modulated modulation symbol of each channel and the generated downlink reference signal to the resource elements.

The radio transmission unit 3077 performs inverse Fast Fourier Transform (IFFT) on the modulation symbol resulting from the multiplexing or the like, generates an OFDM symbol, attaches a CP to the generated OFDM symbol, generates a baseband digital signal, converts the baseband digital signal into an analog signal, removes unnecessary frequency components through a lowpass filter, up-converts a result of the removal into a signal of a carrier frequency, performs power amplification, and outputs a final result to the transmit and receive antenna 309 for transmission.

More specifically, the terminal apparatus 1 according to the present embodiment includes the reception unit 105 configured to receive the first UL grant, the second UL grant and the random access response grant, and the transmission unit 107 configured to perform transmission with the PUSCH. In a case that the transmission with the PUSCH corresponds to the second UL grant to which CRC parity bits scrambled with the C-RNTI are attached, first transmission is performed with the PUSCH at the Transmission Time Interval of a length indicated using the second UL grant. In a case that the transmission with the PUSCH corresponds to the random access response grant, second transmission with the PUSCH is performed at the Transmission Time Interval of a length of 1 ms. The bandwidth for the first transmission with the PUSCH is scheduled using the first UL grant. The bandwidth for the second transmission with the PUSCH is scheduled using the random access response grant.

Here, the SC-FDMA symbol including the DMRS associated with the first transmission with the PUSCH may be indicated using the second UL grant, and the DMRS associated with the second transmission with the PUSCH may be included in the fourth SC-FDMA symbol of a slot associated with the second transmission with the PUSCH.

The timing of the first transmission with the PUSCH may be indicated using the second UL grant.

The base station apparatus 3 according to the present embodiment includes the transmission unit 307 configured to transmit the first UL grant, the second UL grant and the random access response grant, and the reception unit 305 configured to perform reception with the PUSCH. In a case that the reception with the PUSCH corresponds to the second UL grant to which CRC parity bits scrambled with the C-RNTI are attached, first reception is performed with the PUSCH at the Transmission Time Interval of a length indicated using the second UL grant. In a case that the transmission with the PUSCH corresponds to the random access response grant, second reception with the PUSCH is performed at the Transmission Time Interval of a length of 1 ms. The bandwidth for the first reception with the PUSCH is scheduled using the first UL grant. The bandwidth for the second reception with the PUSCH is scheduled using the random access response grant.

Here, the SC-FDMA symbol including the DMRS associated with the first reception with the PUSCH may be indicated using the second UL grant, and the DMRS associated with the second reception with the PUSCH may be included in the fourth SC-FDMA symbol of a slot associated with the second reception with the PUSCH.

The timing of the first reception with the PUSCH may be indicated using the second UL grant.

This allows the uplink data to be efficiently transmitted. For example, by the terminal apparatus 1 performing the operation 1 in the case of the predetermined condition being satisfied, it is possible for the terminal apparatus 1 to coexist with a terminal apparatus corresponding to the past resource. This makes it possible to efficiently use the uplink resource, and efficiently transmit the uplink data.

Further, by the terminal apparatus 1 performing the operation 1 in the case of the predetermined condition being satisfied, communication can be continued even in a situation in which configurations in the base station apparatus 3 and the terminal apparatus 1 do not match each other. For example, communication can be continued in such a situation that the base station apparatus 3 is assumed that a sTTI being configured, while the terminal apparatus 1 is assumed that a sTTI not being configured (e.g., during the configuration being performed in a higher layer). This allows the uplink data to be efficiently transmitted.

A program running on each of the base station apparatus 3 and the terminal apparatus 1 according to the present invention may serve as a program that controls a Central Processing Unit (CPU) and the like (a program for causing a computer to operate) in such a manner as to enable the functionalities according to the above-described embodiment of the present invention. The information handled in these devices is temporarily stored in a Random Access Memory (RAM) while being processed. Thereafter, the information is stored in various types of Read Only Memory (ROM) such as a flash ROM and a Hard Disk Drive (HDD), and when necessary, is read by the CPU to be modified or rewritten.

Moreover, the terminal apparatus 1 and the base station apparatus 3 according to the above-described embodiment may be partially achieved by a computer. In this case, this configuration may be realized by recording a program for realizing such control functions on a computer-readable recording medium and causing a computer system to read the program recorded on the recording medium for execution.

Note that it is assumed that the "computer system" refers to a computer system built into the terminal apparatus 1 or the base station apparatus 3, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a fixed period of time, such as a volatile memory within the computer system which functions as a server or a client. Furthermore, the program may be configured to realize some of the functions described above, and also may be configured to be capable of realizing the functions described above in combination with a program already recorded in the computer system.

Furthermore, the base station apparatus 3 according to the above-described embodiment is achieved as an aggregation (a device group) constituted of multiple devices. Each of the devices constituting such a device group may include some or all portions of each function or each functional block of the base station apparatus 3 according to the above-described embodiment. The device group may include each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functions of a node higher than an eNodeB.

Furthermore, some or all portions of each of the terminal apparatus 1 and the base station apparatus 3 according to the above-described embodiment may be achieved as an LSI which is a typical integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case that with advances in semiconductor technology, a circuit integration technology with which an LSI is replaced appears, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described in the embodiments is also included in the technical scope of the present invention.

REFERENCE SIGNS LIST 1 (1A, 1B, 1C) Terminal apparatus
3 Base station apparatus
101 Higher layer processing unit
103 Control unit
105 Reception unit
107 Transmission unit
301 Higher layer processing unit
303 Control unit
305 Reception unit
307 Transmission unit
1011 Radio resource control unit
1013 Scheduling information interpretation unit
1015 sTTI control unit
3011 Radio resource control unit
3013 Scheduling unit
3015 sTTI control unit

The invention claimed is:

1. A terminal device that is configured to communicate with a base station device, comprising:
receiving circuitry configured to receive on a physical downlink control channel, a first downlink control information (DCI) format, the first DCI format being used for scheduling of a physical uplink shared channel in a subframe,
the receiving circuitry configured to receive on a short physical downlink control channel, a second DCI format, the second DCI format being used for scheduling of a physical uplink shared channel in a slot,
transmitting circuitry configured to perform, based on a detection of the first DCI format on the physical downlink control channel, a corresponding physical uplink shared channel transmission in a subframe, and
the transmitting circuitry configured to perform, based on a detection of the second DCI format on the short physical downlink control channel, a corresponding physical uplink shared channel transmission in a slot, wherein
in a case that the receiving circuitry configured to detect a random access response grant,
the transmitting circuitry configured to perform, based on a detection of the random access response grant, a corresponding physical uplink shared channel transmission in a subframe.

2. A base station device that is configured to communicate with a terminal device, comprising:
transmitting circuitry configured to transmit on a physical downlink control channel, a first downlink control information (DCI) format, the first DCI format being used for scheduling of a physical uplink shared channel in a subframe,
the transmitting circuitry configured to transmit on a short physical downlink control channel, a second DCI format, the second DCI format being used for scheduling of a physical uplink shared channel in a slot,
receiving circuitry configured to perform, based on the transmission of the first DCI format on the physical downlink control channel, a corresponding physical uplink shared channel reception in a subframe, and
the receiving circuitry configured to perform, based on the transmission of the second DCI format on the short physical downlink control channel, a corresponding physical uplink shared channel reception in a slot, wherein
in a case that the transmitting circuitry configured to transmit a random access response grant,
the receiving circuitry configured to perform, based on the transmission of the random access response grant, a corresponding physical uplink shared channel reception in a subframe.

3. A communication method of a terminal device that is configured to communicate with a base station device, comprising:
receiving on a physical downlink control channel, a first downlink control information (DCI) format, the first DCI format being used for scheduling of a physical uplink shared channel in a subframe, receiving on a short physical downlink control channel, a second DCI format, the second DCI format being used for scheduling of a physical uplink shared channel in a slot, performing, based on a detection of the first DCI format on the physical downlink control channel, a corresponding physical uplink shared channel transmission in a subframe, and performing, based on a detection of the second DCI format on the short physical downlink control channel, a corresponding physical uplink shared channel transmission in a slot, wherein in a case of detecting a random access response grant, performing, based on a detection of the random access response grant, a corresponding physical uplink shared channel transmission in a subframe.

4. A communication method of a base station device that is configured to communicate with a terminal device, comprising:

transmitting on a physical downlink control channel, a first downlink control information (DCI) format, the first DCI format being used for scheduling of a physical uplink shared channel in a subframe, transmitting on a short physical downlink control channel, a second DCI format, the second DCI format being used for scheduling of a physical uplink shared channel in a slot, performing, based on the transmission of the first DCI format on the physical downlink control channel, a corresponding physical uplink shared channel reception in a subframe, and performing, based on the transmission of the second DCI format on the short physical downlink control channel, a corresponding physical uplink shared channel reception in a slot, wherein in a case of transmitting a random access response grant, performing, based on the transmission of the random access response grant, a corresponding physical uplink shared channel reception in a subframe.

* * * * *